United States Patent
Berens et al.

(10) Patent No.: US 8,356,776 B2
(45) Date of Patent: Jan. 22, 2013

(54) AUTOMATIC CONTROL OF A HIGH LIFT SYSTEM OF AN AIRCRAFT

(75) Inventors: Martin Berens, Bremen (DE); Juergen Quell, Hamburg (DE); August Kroeger, Holm (DE)

(73) Assignee: Airbus Operations GmbH, Hamburg (DE)

( * ) Notice: Subject to any disclaimer, the term of this patent is extended or adjusted under 35 U.S.C. 154(b) by 539 days.

(21) Appl. No.: 12/679,624

(22) PCT Filed: Sep. 24, 2008

(86) PCT No.: PCT/EP2008/008075
§ 371 (c)(1),
(2), (4) Date: Mar. 23, 2010

(87) PCT Pub. No.: WO2009/040102
PCT Pub. Date: Apr. 2, 2009

(65) Prior Publication Data
US 2010/0200704 A1 Aug. 12, 2010

(30) Foreign Application Priority Data
Sep. 24, 2007 (DE) .......................... 10 2007 045 547

(51) Int. Cl.
*G05D 1/12* (2006.01)
(52) U.S. Cl. .............. 244/183; 701/3; 701/11
(58) Field of Classification Search .......... 244/180–186; 701/3, 4, 11
See application file for complete search history.

(56) References Cited

U.S. PATENT DOCUMENTS
2,350,751 A 6/1944 Gliubich
(Continued)

FOREIGN PATENT DOCUMENTS
EP 1498794 A 1/2005
(Continued)

OTHER PUBLICATIONS
International Search Report for corresponding PCT application PCT/EP081008075, dated Dec. 23, 2008.
(Continued)

*Primary Examiner* — Timothy D Collins
*Assistant Examiner* — Nicolas McFall
(74) *Attorney, Agent, or Firm* — Matthew B. Dernier, Esq.; Gibson & Dernier LLP

(57) ABSTRACT

A device for automatically controlling a system of high-lift elements of an aircraft, which high-lift elements can be set to a retracted and to several extended configurations for cruising, holding flight, takeoff or landing; comprising a flap control unit that by way of a control connection is connected, so as to be functionally effective, to a drive system of the high-lift elements; and an operating unit, connected to the flap control unit, for entering operating instructions that influence the setting of the high-lift elements, where the flap control unit is provided for calculating switching speeds that are associated with the respective configurations of the high-lift elements, where the direction of the configuration change and the operating modes of the automatic system for adjusting the high-lift elements, depending on flight state data and further flight-operation-relevant data; and where, in addition, the flap control unit can also automatically carry out switchover of the operating modes for takeoff or for the landing approach and is provided to automatically generate the instructions that instruct the configuration change, depending on the flight speed.

19 Claims, 13 Drawing Sheets

U.S. PATENT DOCUMENTS

| | | |
|---|---|---|
| 4,042,197 A | 8/1977 | Boyle et al. |
| 4,106,730 A | 8/1978 | Spitzer et al. |
| 6,643,568 B2 | 11/2003 | Chatrenet et al. |
| 7,366,592 B2 | 4/2008 | Delaplace et al. |
| 2002/0099479 A1 | 7/2002 | Chatrenet et al. |
| 2006/0049308 A1 | 3/2006 | Good |
| 2007/0057114 A1 | 3/2007 | Boissenin |
| 2007/0185628 A1 | 8/2007 | Delaplace et al. |

FOREIGN PATENT DOCUMENTS

| | | |
|---|---|---|
| EP | 1684144 A1 | 7/2006 |
| FR | 2817535 A | 6/2002 |

OTHER PUBLICATIONS

International Preliminary Report on Patentability and Written Opinion for corresponding PCT application PCT/EP08/008075, dated May 4, 2010.

| Configuration | $\delta_S$ | $\delta_F$ | Flight Phase | | |
|---|---|---|---|---|---|
| 0 | 0° | 0° | | Holding Flight | Cruising |
| 1 | 15° | 0° | Start | | Holding Flight |
| 2 | 20° | 20° | Start | Landing | Approach |
| 3 | 20° | 30° | | Landing | |

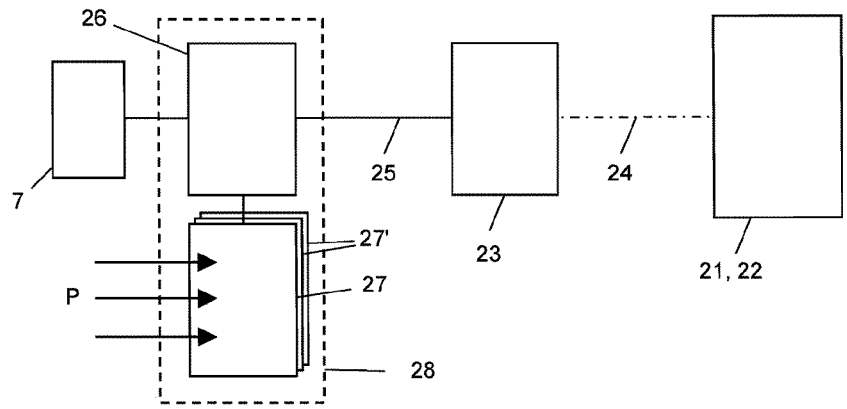
Figure 2
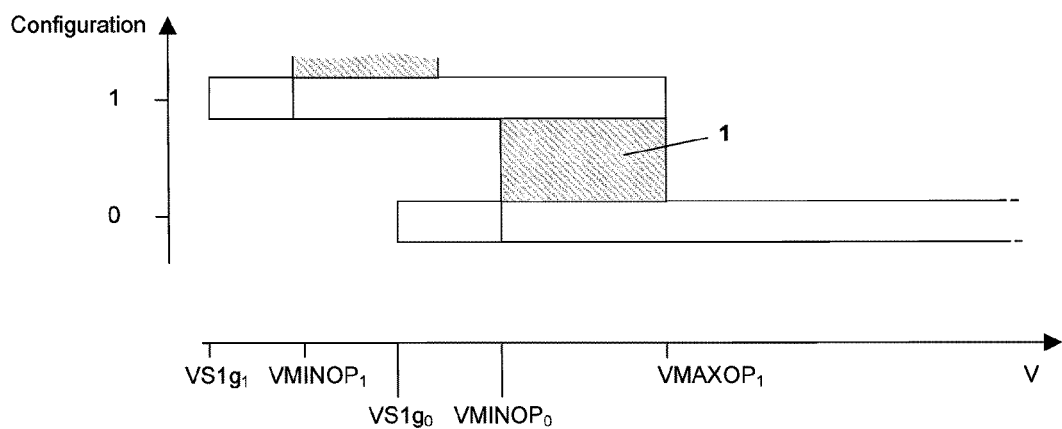
Figur 3
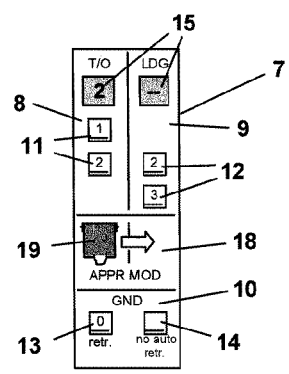
Figure 4

Figur 15

AUTOMATIC CONTROL OF A HIGH LIFT SYSTEM OF AN AIRCRAFT

CROSS REFERENCE TO RELATED APPLICATIONS

This application claims priority to PCT Application No. PCT/EP2008/008075, filed Sep. 24, 2008; which claims priority to German Patent Application No. DE 10 2007 045 547.1, filed Sep. 24, 2007, the entire disclosures of which applications are hereby incorporated by reference.

BACKGROUND

The invention relates to a device for automatically controlling a high-lift system of an aircraft.

Document US 2006/049308 A1 describes an aircraft wing system with lift devices and a drive system with a drive link coupleable to the lift devices and a control system coupled to the drive system. The control system has a first configuration for which the drive link is operatively coupled to a fist and a second deployable lift devices, wherein activation of at least a portion of the drive link moves the fist and second deployable lift device. The control system further has a second configuration for which the drive link is operatively coupled to the first deployable lift device and operatively decoupled from the second deployable lift device, wherein on activation of at least a portion of the drive link the first deployable lift device moves relative to the second deployable lift device.

A multitude of high-lift systems that are used to increase maximum lift on the wing of aircraft during takeoff, landing and slow flight are known. These are used in civil commercial aircraft and in other transport aircraft as well as in business aircraft and motorised sports aircraft. In the case of civil commercial aircraft and other transport aircraft, high-lift systems with wing leading-edge flaps and wing trailing-edge flaps have become widespread as aerodynamically effective high-lift elements. Wing leading-edge flaps are designed with or without a gap between the flap and the main wing, while trailing-edge flaps are usually designed as single-gap or multiple-gap trailing-edge flaps.

As a rule, activation of such flaps or high-lift elements presently takes place manually by way of an operating lever in the cockpit, wherein in a flap control unit electrical signals are generated that correspond to the lever position, which signals control the flap position by means of electrical or hydraulic actuators. Normally, the flaps or high-lift elements are extended for takeoff, holding flight and landing, while they are retracted for cruising so as to reduce aerodynamic resistance or drag. Since in relation to flight performance and noise generation different deflection angles are optimal for takeoff, landing and, if applicable, holding flight, various positions can be selected.

Furthermore, there are concepts for automatically extending leading-edge high-lift devices as a protective measure when a critical angle of attack is exceeded, or when the flight speed drops below a predetermined limit so that stalling and the associated loss of lift are prevented. Moreover, there are systems which by means of retraction are designed to prevent structural overload of the leading-edge flaps or the trailing-edge flaps when an upper predetermined limit flight speed is exceeded.

In addition, concepts are known that aim to automate the control of high-lift systems. In these concepts a differentiation can be made between those that are intended to optimise flight performance, which is in particular relevant to takeoff, and those which are primarily intended to protect the aircraft from any damage or from the occurrence of uncontrolled flight states.

From U.S. Pat. No. 2,350,751 a system is known in which both control and extension and retraction of trailing-edge flaps are carried out electrically by means of a motor. Flap control is to be controlled in such a manner that maximum lift of the aircraft wing is increased. A flap lever makes it possible to manually select among three different deflection angles, namely one in which the deflection angle is zero (hereinafter also referred to as "retracted state" or "cruising position"), one for takeoff, and one for landing. The known system is designed for automatically retracting the flaps after takeoff when a certain dynamic pressure is exceeded. According to a flap lever position that is selected in flight by way of the flap lever, the flaps automatically extend to the corresponding takeoff or landing position if the dynamic pressure drops below a threshold value that is independent of the selected configuration.

The system makes it possible, in the case of dynamic pressures below the dynamic-pressure threshold value, to select any of the three flap positions by way of the flap lever, wherein the selected configurations are assumed immediately. Above the threshold value, independently of the position of the flap lever, a transition to the retracted position is always initiated.

Disadvantageously, the known system provides only for a single switching dynamic pressure. Due to aerodynamic, structural/mechanical and flight-performance-related boundary conditions of high-lift systems of large modern aircraft, suitable speeds for resetting the flaps from the takeoff position to the cruising position vary greatly in relation to the speed of extending the flaps from the cruising position to the landing approach position. The usual manually-operated flap systems of these aircraft take account of the adjacent discrete flap deflection angles, i.e. flap positions, by means of a cascade of overlapping speed ranges. The change of the flap configuration from the cruising position to the landing position takes place incrementally in intermediate steps. In order to obtain adequate speed overlap in a large commercial aircraft, more than merely two or three different positions for the high-lift flaps are required if at the same time the maximum operating speeds in the individual configurations are limited. For example, the Airbus A320 provides six different positions (0, 1, 1+F, 2, 3, Full). Limiting the maximum operating speed is used to prevent the occurrence of flight states in which inadmissibly high structural loads can act on the high-lift flaps. By limiting the operating speeds, the expected loads are reduced, and consequently, with corresponding dimensioning, the structural weight can be limited to an extent that is optimal in the context of the overall concept.

DE 25 31 799 C3 describes a speed-dependent automatic flap switching device, that comprises largely automatic flap control. It is the objective to prevent the occurrence of accidents resulting from the aircraft's crew failing to set the flaps. In contrast to the previously-mentioned known device, in this design only two flap positions are provided instead of three. In contrast to this, a speed hysteresis continues to be provided, which in flight results in the flaps being retracted at a higher flight speed, and being extended again at a comparatively lower flight speed only if the switch configuration of a dynamic-pressure switch provided in this known automatic flap switching device is not changed. If the dynamic pressure is in a range that is significantly greater than zero, but less than required for liftoff, a contact of the dynamic-pressure switch is closed, which supplies current to the electrical flap drive in the direction of retraction. If the dynamic pressure increases, this current circuit is interrupted. In the higher pressure range that follows the interruption range, which higher pressure range begins below a dynamic pressure required for liftoff, and ends at values that are typical for the initial steep climb, another contact is closed, and as a result of this the flap drive motor is supplied with current in the direction of extension of the flaps. In another embodiment of this known automatic switching device, the current circuit for extending the flaps is closed already at the time of taxiing by way of a switch that is coupled to the rotational speed of the running gear wheels. During further increase to a dynamic pressure that is typical for cruising, the closure of a third contact again results in the flaps being retracted. Between the individual dynamic pressure ranges there are zones in which none of the current circuits is closed. With renewed successive reduction in the dynamic pressure, the above-described sequence takes place in reverse. Thus in the case of very low and very high flight speeds, corresponding to the dynamic pressures that are present, the flap is moved to the retracted state, while in the case of medium dynamic pressures that are typical for liftoff of the aircraft, for initial steep climb as well as for the approach to landing, and for landing, the flap is extended or left in the extended state. According to the known solution it is optionally also possible to manually extend the flaps before takeoff. An open interrupter switch then prevents retraction of the flaps during the takeoff taxiing procedure. The known automatic flap switching device is associated with a disadvantage in that only the selection of one of two flap positions (namely the retracted or the extended position) is possible. There is a further disadvantage in that while the dynamic switching pressures can be modified by displacement of the sliding contacts of the dynamic-pressure switch, this does however require pilot intervention. Depending on the mass of the aircraft at the time, in each case the switching speeds need to be set prior to takeoff and prior to landing, in order to cause retraction or extension of the flaps at suitable speeds.

U.S. Pat. No. 4,042,197 describes a further automatic high-lift system for takeoff and landing of an aircraft, with the difference of the control of both flight phases differing significantly in each flight phase. It is the objective to reduce aircraft noise emissions on the ground during takeoff and landing. As a result of the automatic device, during takeoff earlier retraction of the flaps after liftoff is to take place when compared to conventional manual operation, and consequently the aerodynamic resistance is to be reduced while the climb rate is to be increased early. During the approach, the automatic device is to make it possible for the aircraft to be brought to the landing configuration later than is customary with manual selection of the flap position by a pilot.

In the known automatic device the flaps are manually extended, prior to takeoff, by operating a flap lever. Subsequently the flap lever is moved to the position up to which the automatic device is to retract the flaps automatically after takeoff. No further explanations relating to the necessary switching logic are provided. Automatic retraction of the flaps after takeoff takes place depending on the flight speed after retraction of the running gear. The speed at which retraction of the flaps commences is preselected by the cockpit crew prior to takeoff. Longitudinal acceleration of the aircraft is integrated twice in order to determine the distance from commencement of the takeoff taxiing procedure. When a preselected distance has been reached, a cockpit display indicates to the crew the point for reducing engine thrust. Apart from a reduction in the thrust, the pitch angle of the aircraft is reduced to such an extent that the aircraft at a significantly reduced climb rate accelerates despite the reduced propulsion, thus finally reaching the switching speed for retracting the flaps.

In this known automatic high-lift system in the approach phase it is provided for the flaps to be extended depending on the distance to the (desired) touchdown point or on the continuously measured altitude. In the first case the distance information is provided either by an inertial navigation system or by way of evaluating a DME-signal. In the second case the barometric altitude is used, which is explicitly preferred to the radio altitude. Both the operating mode and the distance or the altitude at which the landing configuration is to be attained is specified by the cockpit crew by way of an operating unit. The known system provides for an approach to landing with continuous deceleration, during which approach the flaps are also continuously moved from the retracted position to the landing position. Both the engine thrust and the setting angle of a trimmable elevator tail plane are adjusted to the respective flap position by way of the pre-control functions. The speed instruction for the propulsion regulating device is adjusted depending on the flap position. In a final approach speed entered by the pilot, by way of the operating device, as the lower limit, the landing flap configuration is finally attained.

This known automatic high-lift system is associated with a disadvantage in that prior to the approach the pilots need to manually state which signals are to be used to control the automatic device for the high-lift flaps. Manual specification of flight guidance parameters (speed, distance, altitude) by pilots not only increases their workload but is also associated with the danger of incorrect entry. There is no go-around logic circuit provided for cases in which the landing approach is aborted in favour of go-around, and consequently a manual operating device parallel to the described automatic device is required.

Finally, apart from a function that supports the pilot or pilots, which function comprises a signal for displaying the extension of the high-lift flaps at an optimum point in the approach trajectory, EP 1 684 144 A1 proposes as an alternative the use of said supporting signal for automatic extension of the high-lift flaps. It is stated that the automatic function is preferably to be implemented in a flight management system. To this effect a navigation system is used that is based on the preplanning of the lateral and vertical flight path profiles. Switching conditions for the transition from one path section to another, and also for generating a signal that causes the high-lift flaps to be brought to a position that corresponds to pre-planning, are determined in the form of altitudes, flight speeds or lateral positions of the aircraft, or in the form of a combination of these parameters. If the state parameters that are necessary for switching reach or exceed the switching conditions, then the high-lift means are brought to the position allocated according to planning.

This functionality is associated with a disadvantage in that it can only be applied to the approach phase. Thus, automatic operation of the high-lift flaps is not provided for during flight preparation, taxiing on the ground, takeoff, climbing flight and cruising, go-around after an aborted approach, during landing, and during operation on the ground after landing. Furthermore, for guiding the aircraft along the pre-planned flight path, corresponding navigation information is mandatory. If this information is not available, the navigation system does not work, and thus the functionality for automatically extending the high-lift flaps is not available.

SUMMARY OF THE INVENTION

It is the object of the invention to state a device for automatically controlling high-lift systems of an aircraft, which device makes it possible to reduce the workload of the pilot or pilots of the aircraft in flight phases near the ground. In particular, flight safety is to be improved by reducing the possibilities of incorrect operation. Moreover, the flight performance of the aircraft predominantly during takeoff and in climbing flight is to be improved.

The invention creates a device for automatically controlling a high-lift system of an aircraft, which device comprises high-lift elements that can be set to a retracted and to several extended configurations for cruising, holding flight, takeoff or landing; a flap control unit that by way of a control connection is connected, so as to be functionally effective, to a drive system of the high-lift elements; and an operating unit, connected to the flap control unit, for entering operating instructions that influence the setting of the high-lift elements. According to the invention, the flap control unit is provided for calculating the switching speeds that are associated with the respective configurations and with the directions of the configuration change, for adjusting the high-lift elements, depending on flight state data and/or further flight-operation-relevant data; and the flap control unit is provided to automatically generate the instructions that instruct the configuration change, depending on the flight speed and/or other flight state data.

According to a particularly advantageous embodiment of the device according to the invention for automatically controlling a high-lift system of an aircraft, the flap control unit is additionally provided for automatic switchover of operating modes for takeoff and landing approach respectively.

Other advantageous embodiments and improvements of the device according to the invention are disclosed and described herein.

BRIEF DESCRIPTION OF THE DRAWINGS

Below, exemplary embodiments of the invention are explained with reference to the drawing.

The following are shown:

FIG. 2 a block diagram showing a device for automatically controlling a high-lift system of an aircraft according to an exemplary embodiment of the invention together with further components that are significant to the function of the system;

FIG. 3 a diagram providing an understanding of speed definitions used below;

FIG. 4 a top view of an operating unit of a device for automatically controlling a high-lift system of an aircraft, according to an exemplary embodiment of the invention;

DETAILED DESCRIPTION OF THE INVENTION

Figure 1:
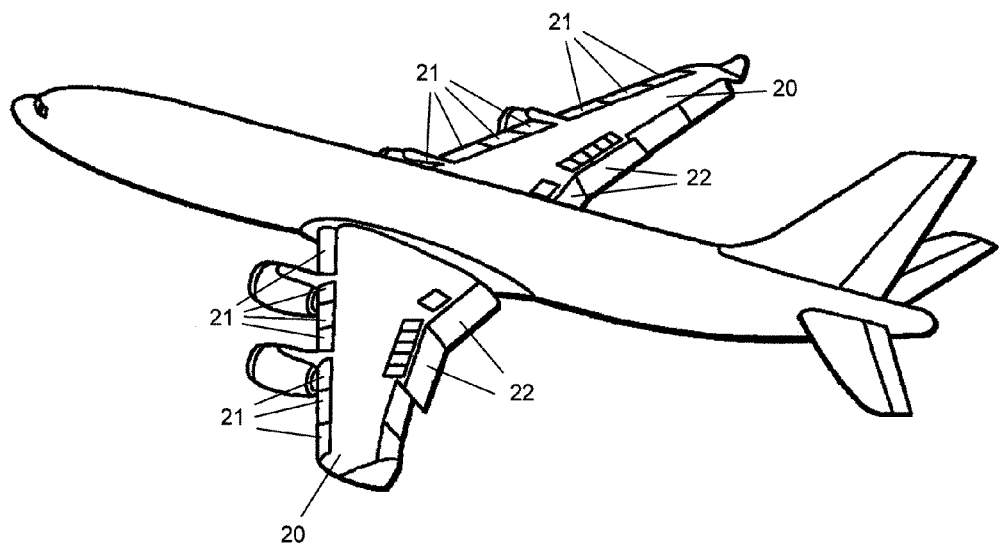
FIG. 1 a diagrammatic view of an aircraft with high-lift elements in the form of leading-edge flaps and trailing-edge flaps arranged on the wing.

FIG. 1 shows part of a high-lift system that is arranged on the wing 20 of an aircraft, which high-lift system comprises high-lift elements in the form of leading-edge flaps 21 and trailing-edge flaps 22. In each case these are extendable and retractable in a suitable manner that is known per se, by means of a drive system 23, 24 shown in FIG. 2 that as a rule comprises at least two drive units 23 and further comprises mechanical drive connections 24 that are coupled to the flaps 21, 22. Controlling the high-lift flaps 21, 22 takes place by means of a flap control unit 26, shown in FIG. 2, which by way of a control connection 25 is connected, so as to be functionally effective, to the drive system 23, 24, in order to adjust the high-lift elements, which in FIG. 2 are designated by reference characters 21, 22, depending on control instructions received by way of said suitable mechanical connections 24.

In a software-based implementation the flap control unit 26 can form part of an on-board computer 28 which apart from further functions 27' also comprises functions for acquiring, processing and transmitting data relevant to the operation of the aircraft. The latter functions are designated by reference character 27.

An operating unit 7 that is connected to the flap control unit 26 is used to set the takeoff configuration of the high-lift flaps 21, 22, the preselection of the landing configuration, and to enter further cooperating instructions that influence the automatic control system.

FIG. 1 shows the high-lift system of the aircraft with leading-edge flaps 21 and trailing-edge flaps 22. However, this is only an exemplary embodiment. The high-lift system can also be provided in some other manner, for example only with trailing-edge flaps 22, by way of flexible wing regions whose curvature is continuously changeable, or in some other suitable manner. This is expressed by the designation "high-lift elements". The invention is not limited to high-lift systems in which leading-edge flaps 21 and trailing-edge flaps 22 are combined.

The control connection 25 between the flap control unit 26 and the drive system 23, 24 on the one hand comprises the transmission of shared instructions in order to set the leading-edge flaps 21 and the trailing-edge flaps 22 to the respectively desired positions, which in summary according to the table on the first page of the illustrations are designated "configurations", and on the other hand comprises the transmission of feedback to the flap control unit 26 by way of the configuration taken up by the high-lift flaps 21, 22.

In the exemplary embodiment presently described the high-lift system comprises n=4 discrete configurations, designated 0, 1, 2 and 3. However, in other exemplary embodiments the system can also comprise a different number, either larger or smaller, of configurations. The table on page 1 of the figures comprises exemplary combinations of possible deflection angles δS of the wing leading-edge flaps 21 and δF of the wing trailing-edge flaps 22, the combination of which is referred to as "configurations". The drive system 23 allocates the instructed positions associated with the respective configuration specifications of the flap control unit 26 to the leading-edge flaps and the trailing-edge flaps according to the table. The table further comprises the allocation of the configurations to the individual flight phases for the present exemplary embodiment.

In order to describe the automatic control of the high-lift flaps 21, 22, the definition of speeds is useful that are of importance in the context of the respective configuration taken up by the high-lift flaps 21, 22. A calibrated flight speed based on air data measuring is used as the primary comparison quantity for control of the aircraft's high-lift system that comprises the high-lift flaps 21, 22. Prior to its further use, a signal that represents the flight speed is smoothed by means of a lowpass filter in order to compensate for short-term interference to the signal, as can for example be caused by turbulence.

Both with the flaps of the high-lift system 21, 22 retracted and with the flaps extended, the normal operating range of an aircraft is limited by operating limit speeds. With reference to an example of two adjacent configurations of the high-lift system 21, 22, FIG. 3 illustrates the positions of the individual speeds.

In configuration 0 both the wing leading-edge flaps 21 and the wing trailing-edge flaps 22 are in a completely retracted position, which corresponds to a cruising position. In configuration 1 the high-lift flaps 21, 22 are in an extended state wherein, as already mentioned above, it is in principle immaterial as to whether in this arrangement leading-edge flaps 21 or trailing-edge flaps 22 are extended, or whether a combination of both flap types or other high-lift elements are activated.

At the speed VS1$g$1 the flow on the wing 20 in the configuration 1 causes stalling if the lift of the aircraft corresponds to the aircraft weight (load multiple n=1). This speed essentially depends on the actual mass of the aircraft and also on the Mach number. With the addition of a safety margin to VS1$g$1 the (higher) minimum operating speed VMINOP1 for configuration 1 s arrived at.

Generally speaking, said safety margin is usually defined by way of factors kj, so that $$VMINOPi = kj \cdot VS1gi,$$

wherein i denotes an index for the individual configurations, and the index j designates various factors k which depending on the configuration can, however, also assume different values depending on the flight phase.

The normal operating range of configuration 1 is upward-limited by a maximum speed VMAXOP1.

The definitions of the speeds VS1$g$0 and VMINOP0 in the cruising configuration 0 are analogous to the definitions for VS1$g$1 and VMINOP1 in configuration 1.

The hatched region 1 designates a speed band, in which the speeds of both configuration 0 and configuration 1 are in the normal operational ranges; in other words both in configuration 1 and in configuration 0 there is adequate lift for safe flight operation. There is also a maximum operating speed in configuration 0, in other words at the upper end of the cruising speed range with fully retracted flaps 21, 22; however, said maximum operating speed is of no significance to the automatic control system of the high-lift system.

In the further description the following scenarios will be considered:
takeoff preparation, takeoff and climbing flight
approach, landing, operation of the aircraft after landing on the ground
holding flight
go-around from the approach segment or go-around after touchdown ("touch and go")
aborting climbing flight and acceleration flight after takeoff with immediately following the landing approach.

It is assumed that all the aircraft systems are fully functional.

FIG. 4 shows an exemplary embodiment of an operating unit 7 of the described automatic high-lift system. The operating unit comprises a part for specifying a takeoff configuration (T/O) 8, a part for preselecting a landing configuration (LDG) 9, a part for switchover from the takeoff mode to the approach mode of the automatic system, 18, and a part for additional control functions on the ground, 10. Individual takeoff configurations can be selected by way of pushbuttons 11 provided in the operator control panel 8 for selecting the takeoff configuration. Correspondingly, pushbuttons 12 make it possible to preselect landing configurations in the operator control panel 9 for landing configuration preselection. Numeric displays 15 are provided in order to display the respective values for confirming the selection made. In the example shown in FIG. 4, configuration 2 was selected for takeoff, but no landing configuration was preselected.

A pushbutton 13 provided in the operator control panel 10 for the ground control functions makes it possible to retract the high-lift devices on the ground. A toggle switch 14 is used as an automatic-system lock; when activated said toggle switch 14 makes it possible to prevent automatic retraction of the high-lift flaps 21, 22 after landing. The switching state of the automatic-system lock 14 is shown by a light integrated in the switch. When a pushbutton switch 19 in the operator control panel for switchover 18 is activated, in flight an explicit direct switchover from the takeoff operating mode to the approach mode of the automatic system can be carried out in case approach and landing are to occur immediately after takeoff, and the flight speed is not yet sufficient for the provided automatic operating mode switching to take place. The switch 19 can be covered by a flap in order to prevent unintended activation.

Further information about the current state of the system, in particular about the automatically or manually instructed desired configuration and the current position of the wing leading-edge flaps 21 and trailing-edge flaps 22, as well as information about any system malfunctions is provided to the crew by way of conventional cockpit display devices which themselves do not form part of the invention.

Figure 5:
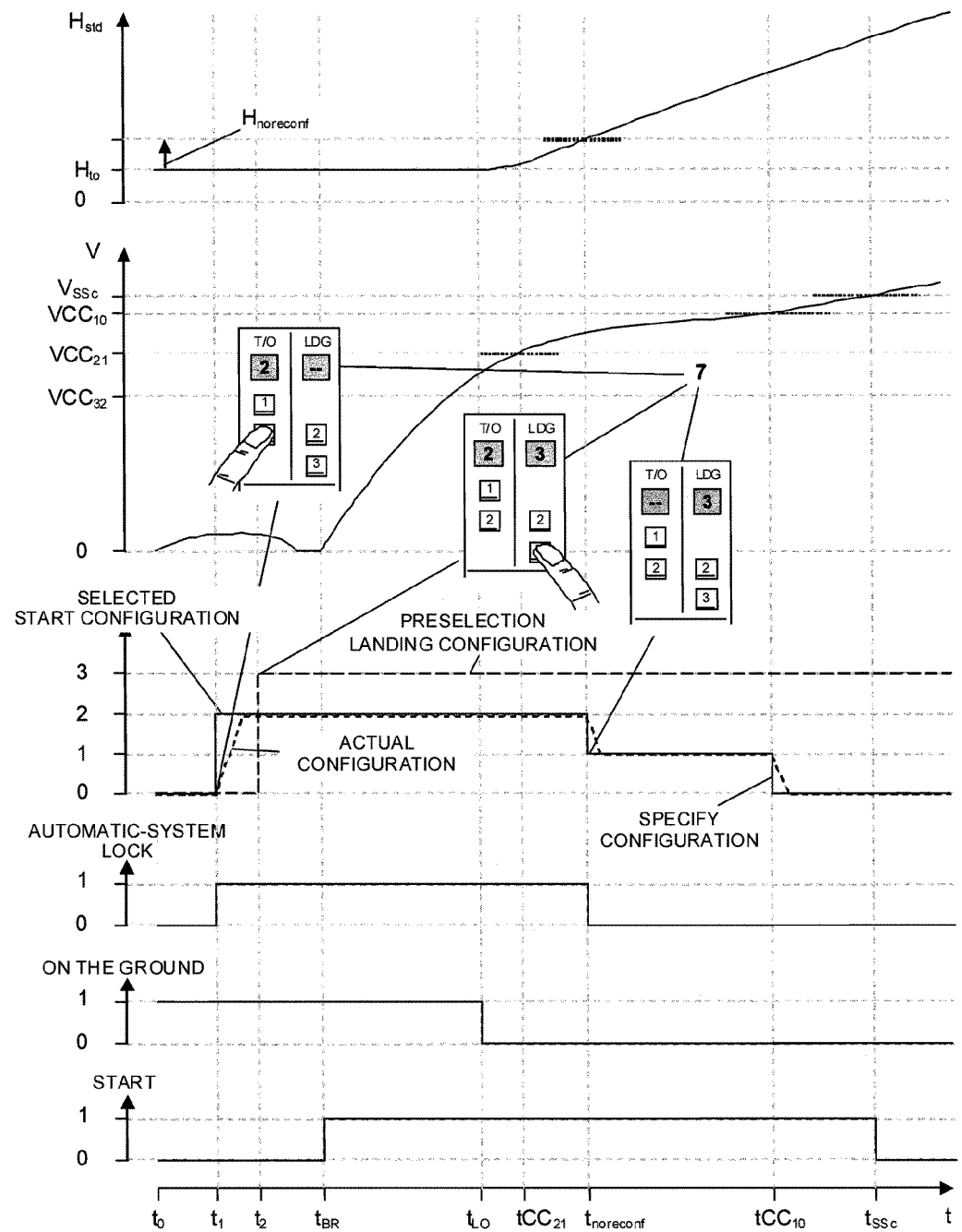
FIG. 5 a time diagram showing progressions over time of state parameters and control parameters during takeoff, according to an exemplary embodiment of the invention.

FIG. 5 shows the progression over time of state parameters and control parameters during preparation for takeoff, during takeoff and during climbing flight of the aircraft.

With the aircraft at a standstill or taxiing on the ground, the required takeoff position of the high-lift flaps 21, 22 is manually specified by a pilot by way of the pushbuttons 11 of section 8 of the operating unit 7, compare FIG. 4. In the example shown this is configuration 2, compare FIG. 5.

Retracting the high-lift elements 21, 22 on the ground is possible, if necessary, by activating the pushbutton 13 of the operator control panel 10 ground control functions of the operating unit 7, wherein the system is reset to its initial state.

In order to prevent premature retraction of the flaps during the takeoff procedure, the parameter "AUTOMATIC-SYSTEM LOCK" is set to the value 1 by means of the takeoff configuration selection.

In the present exemplary embodiment implementation of the flap position signals of the automatic flap switching device is prevented until such time as the signal "AUTOMATIC-SYSTEM LOCK" switches to the value zero. In the present exemplary embodiment, switchover of the signal "AUTOMATIC-SYSTEM LOCK" to zero takes place after an altitude above the level of the runway is attained, which altitude corresponds to the predefined value Hnoreconf.

In other exemplary embodiments the switching point of the automatic-system lock can also be linked with other conditions or combinations thereof, for example retracting the running gear after a distance measured from the point of rolling away on the runway has been travelled, or after the switch of the signal "ON THE GROUND" has been set to zero. The signal "ON THE GROUND" is determined in the known way, for example by means of a sensor with reference to the inward spring action of the main landing gear struts of the aircraft. If the running gear strut is subjected to outward spring action as a result of load release during liftoff, this signal is set to the value zero.

Furthermore it is imaginable that switching the parameter "AUTOMATIC-SYSTEM LOCK" takes place only after a delay time has passed after the necessary switching condition or switching conditions have occurred.

Preferably, already before takeoff, at t2 by way of the pushbuttons 12 of part 9 of the operating unit 7, (pre-) selection of a configuration, which is envisaged to be suitable, of the high-lift flaps 21, 22 is made for approach and landing at the intended destination. In the example shown this is configuration 3 (compare FIG. 5). If required, this selection can be adjusted, manually by the crew during the flight, to any changing approach conditions (wind, path). In order to lessen the severity of consequences of any operator errors, in the approach mode described later on, the high-lift flaps 21, 22 are brought in a speed-dependent manner to the configuration that is usually envisaged for landing, unless manual preselection has taken place.

By setting the takeoff thrust to the point in time tBR a corresponding signal is generated, and automatic switchover of the parameter "TAKEOFF" from the value zero to the value 1 takes place, which corresponds to switching over from the approach mode to the takeoff mode. In this switching configuration the configuration change speeds are used for takeoff.

The aircraft accelerates on the runway until it lifts off at tLO. Shortly thereafter, in the example shown in FIG. 5, the first switching condition for retracting the flaps from configuration 2 to configuration 1 at tCC21 is attained. However, the automatic-system lock prevents the signal for retracting the high-lift flaps 21, 22 from being implemented.

When the altitude Hnoreconf has been attained the parameter "AUTOMATIC-SYSTEM LOCK" is set to the value 0. The still valid signal for retracting the high-lift flaps 21, 22 from configuration 2 to configuration 1 is then at the point in time tnoreconf brought to be automatically implemented.

Immediately after switchover of the control specification, continuous checking of the next switching condition takes place, which generates a control instruction for the configuration zero when the speed reaches a value greater than VCC10.

This switching condition is attained at tCC10, and a signal is generated which moves the high-lift flaps 21, 22 to the fully retracted configuration 0 for cruising.

In the present exemplary embodiment, if the speed VSSc is exceeded, the signal "TAKEOFF" is set from value 1 to value 0. The speed VSSc is the greater of the two speeds VCC10 or VCC01,APPR, of which the latter is defined for extending the high-lift flaps 21, 22 from the fully retracted configuration to the first extended configuration in the approach mode of the automatic system.

Figure 6:
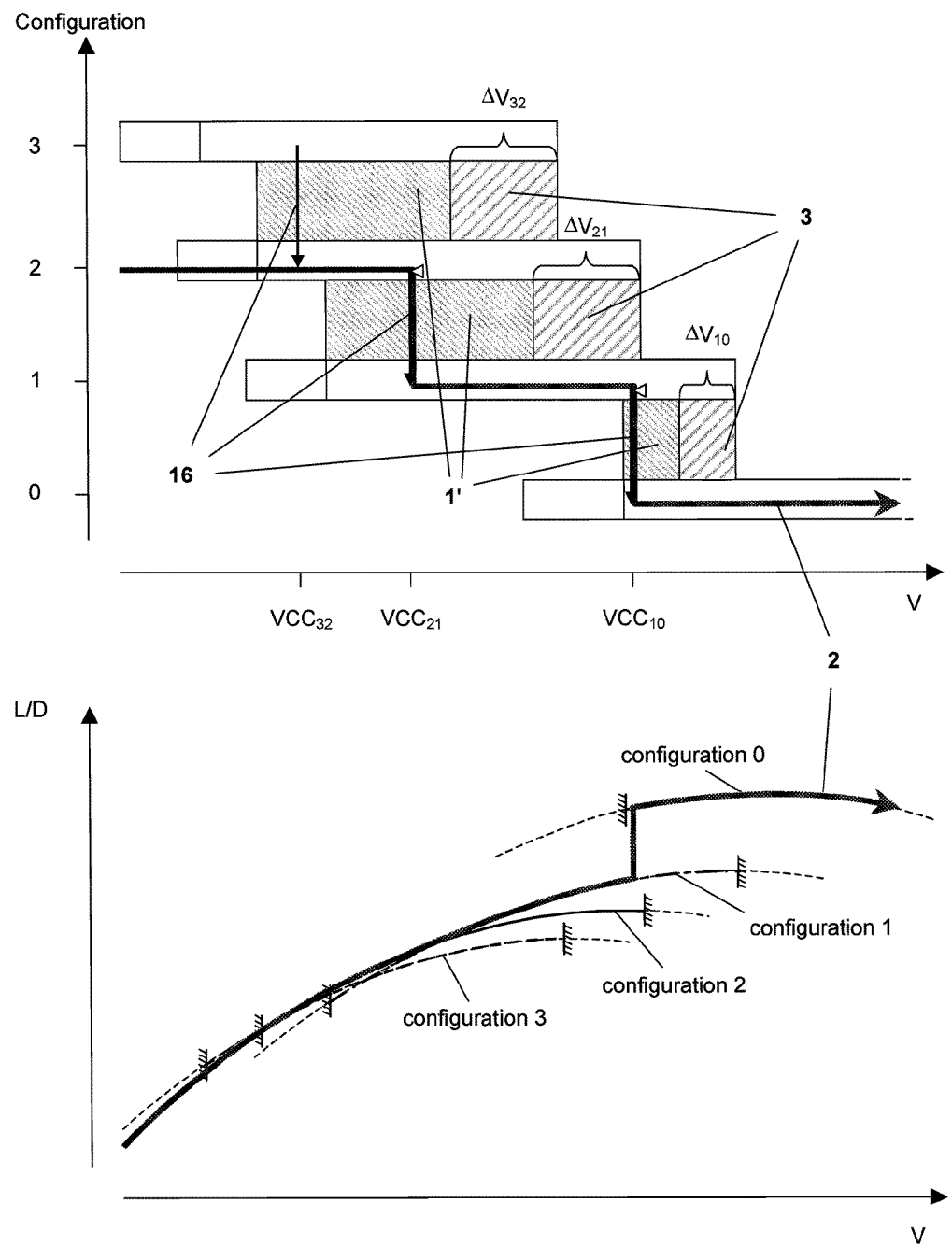
FIG. 6 diagrams showing a climb-performance-optimised working curve relating to a speed-controlled device for automatically controlling a high-lift system of an aircraft during takeoff, according to an exemplary embodiment of the invention, as well as associated flap configurations depending on the speed.

FIG. 6 diagrammatically shows an example of the way switching speeds $VCC_{i+1, i}$ (i=0, . . . , n−1; n−index of the highest configuration, in the present example 3) can be determined, which switching speeds result in the highest possible ratio of lift L to drag D (glide ratio) during progression of takeoff and a climbing flight, thus resulting in the highest possible climbing speeds (in the case of idealised propeller propulsion) or climbing gradients (in the case of idealised turbojet propulsion). For a given aircraft mass the glide ratio depends on the speed and on the high-lift configuration as well as on the running gear configuration. Furthermore, the conditions shown in FIG. 6, below, change with the flight Mach number, but to a lesser extent. Depending on the propulsion characteristic and the desired degree of performance to be optimised, the switching speeds can also be determined with reference to curves of quality measures other than the glide ratio.

Path 2 in FIG. 6 shows a favourable combination of configuration change speeds, i.e. the speeds of the aircraft during aircraft acceleration, in which a change or switchover between the individual configurations takes place. This combination is used as an example for explaining the determination of these speeds, in which the positions of the high-lift flaps 21, 22 are adjusted. These switching speeds or configuration change speeds are determined in such a way that a change to the next-smaller configuration is initiated whenever the glide ratio in the subsequent configuration is greater than in the present configuration. For practical implementation of the automatic system, suitable change speeds are preferably interpolated from an aircraft-specific values table, depending on the aircraft mass at the time. As an alternative to this, the data can also be stored depending on the aircraft mass and the flight altitude, or depending on the aircraft mass and the flight Mach number. Moreover, in further embodiments the running gear position at the time is taken into account.

In the exemplary embodiment presently described, the condition is to be met wherein the configuration change speeds are always in the overlap regions 1' that are formed by shared operational speed bands 1 in each case of two adjacent high-lift configurations, and at the same time take into account the additional speed margins 3.

When setting the switching speed tables for automatic control, speed margins, $V_{i+1, i}$ are taken into account that are designated by reference character 3, which additionally impose an upward limit on the configuration change speeds. By taking into account suitably determined speed margins 3 the risk of exceeding maximum speeds VMAXOP is avoided. Such limitations become effective if configuration change speeds determined according to flight performance criteria would be above the limits.

The vertical arrows 16 at the top of FIG. 6 designate the configuration change speeds in the operating mode "TAKE-OFF" of the automatic system. If the measured and lowpass-filtered calibrated flight speed exceeds the configuration change speed at which the high-lift elements or high-lift flaps 21, 22 are moved to a more retracted position, then a signal is generated which causes the high-lift elements 21, 22 to retract to the next-lower position. In the exemplary embodiment presently described, only retraction of the high-lift flaps 21, 22 is provided for the takeoff procedure, but not extension. Further embodiments can, however, also provide for automatic renewed extension of the high-lift flaps 21, 22 if the speed drops below configuration change speeds for extension. Without operating mode switching, these configuration change speeds need to be lower than, or equal to, the configuration change speeds for retracting the high-lift flaps 21, 22.

Often, there is a maximum altitude HSF, max at which the high-lift flaps 21, 22 of an aircraft may be extended. If such a maximum operating altitude exists, and if the high-lift flaps are in the extended state when this altitude is exceeded, an acoustic and visual warning is issued to the crew, combined with a corresponding recommendation on the display device, provided for this, to increase the flight speed so that the automatic system can cause the flaps to be retraced. While signals for retracting the high-lift flaps 21, 22 are always implemented, no extension signals are generated above the maximum operating altitude HSF, max.

Figure 7:
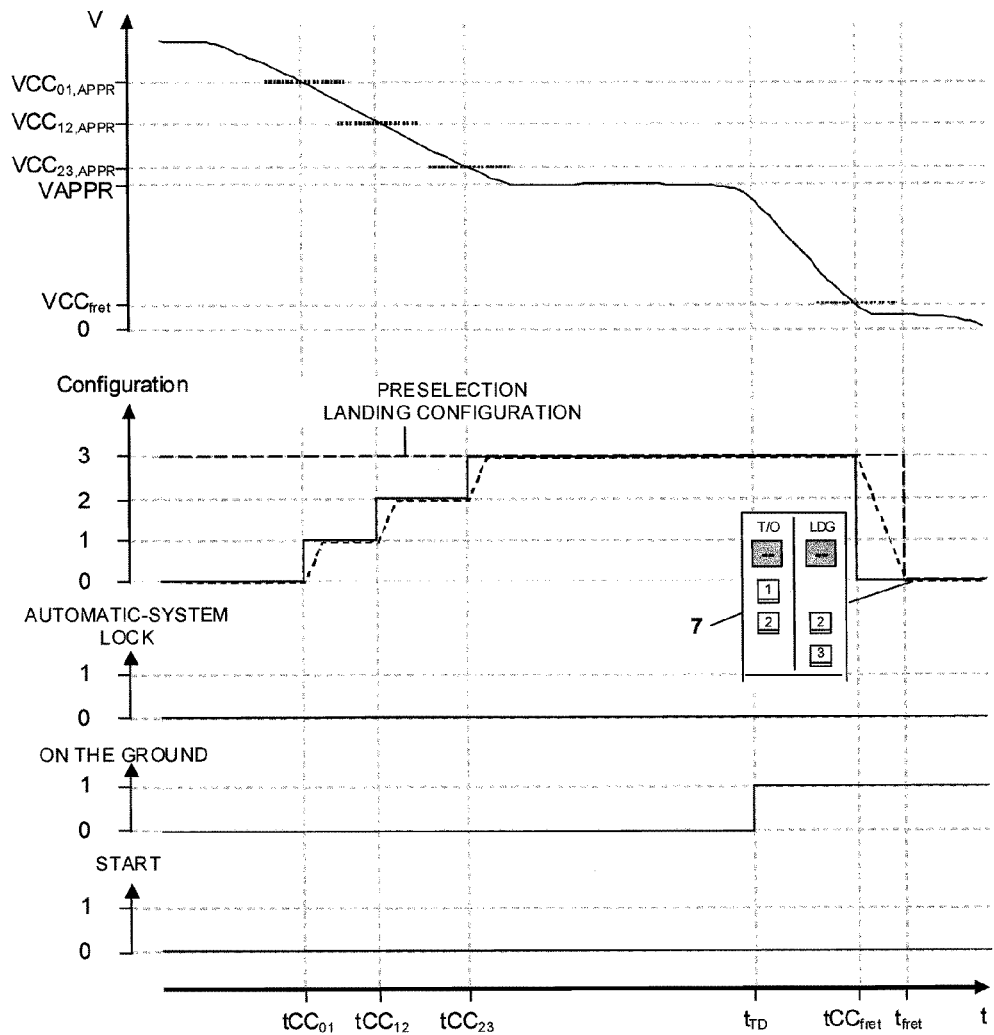
FIG. 7 a diagram showing progressions over time of state parameters and control parameters during approach, landing and during taxiing after landing, according to an exemplary embodiment of the invention.

In a manner that is analogous to that of FIG. 5, FIG. 7 shows diagrams with progressions of parameters that are significant in relation to the described automatic high-lift system, except for the difference that in FIG. 7 the operating phases of approach and landing as well as ground operation after landing are considered.

After descent from the cruising altitude at a speed greater than the configuration change speed VCC01, APPR the aircraft is decelerated, which can take place either in an approach segment of constant altitude or in a slight descent. If the speed drops below VCC01, APPR at tCC01, a signal is issued for extending the high-lift flaps 21, 22 from configuration 0, the cruising configuration, to the first extended configuration 1. Further deceleration of the aircraft gradually leads to dropping below the configuration change speeds VCC12, APPR and VCC23, APPR that result in extension of the high-lift flaps 21, 22 right through to the preselected landing configuration 3. The approach is then continued with a constant configuration and approach speed VAPPR until levelling off and touchdown on the ground at tTD, wherein the signal "ON THE GROUND", which has already been described above, is set from value 0 to value 1.

If the speed of the aircraft is reduced to below VCCfret, the flaps 21, 22 are fully retracted. An acoustic signal and a text display on the display device of the cockpit, which display device is provided for this purpose, inform the cockpit crew that the flaps are now automatically being fully retracted and that it is no longer possible to carry out a regular go-around manoeuvre without again entering the takeoff configuration. In a further embodiment variant this condition can also take place with the use of the true speed of the aircraft relative to an earth-referenced point. When the high-lift flaps 21, 22 are fully retracted, at the point in time tfret a corresponding signal is generated, and the value for control preselection for the approach is deleted.

Figure 8:
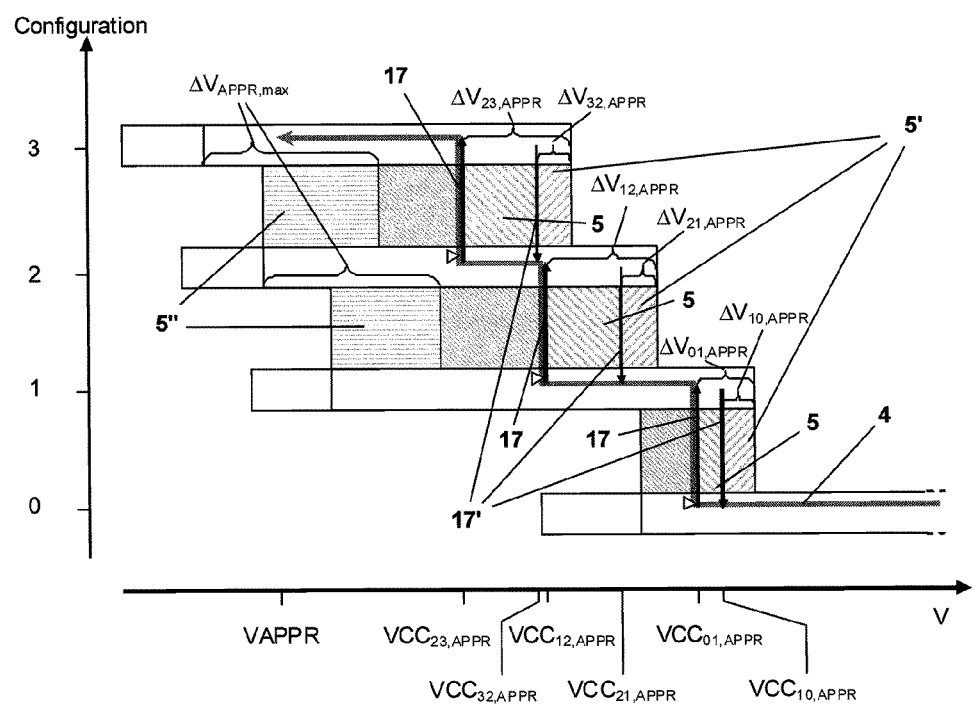
FIG. 8 a diagram showing a working curve for a speed-controlled device for automatically controlling a high-lift system of an aircraft during approach, according to an exemplary embodiment of the invention.

FIG. 8 shows the working curves that apply to the approach mode. The function is explained with reference to the shown speed path 4 which mirrors the part of the progression over time, shown in FIG. 7, of an approach until VAPPR is attained. In the exemplary embodiment shown the configuration change speeds 17 are determined, in relation to the upper limits VMAXOPi+1, by way of individual differential speeds Vi, i+1, APPR (i=0, ..., n−1) which result from the sum of the regions designated by the reference characters 5 and 5'. These differential speeds are selected in an aircraft-specific and configuration-specific manner.

The margin to the upper limits of the configurations with the respective next-higher index ensures that an adequate distance to the switching speeds 17' is maintained, wherein, if the upper limits are exceeded, incremental retraction of the trailing edge flaps and/or the leading-edge flaps 21, 22 is initiated. This retraction functionality combines already-known protective functions which reduce the risk of excessive loads occurring on the flaps by moving back the flap deflection, with the operational necessity that in the approach mode, i.e. "TAKEOFF"=0, the configurations can be reduced even without exceeding the maximum operating speeds VMAXOP. In FIG. 8 the speed margins which also define these switching speeds relative to the maximum operating speeds are referred to as Vi+1, i, APPR and are characterised by reference character 5'. Since the number of cases in which the retraction functionality is used is expected to be small, the margins 5' to the maximum operating speeds is preferably small.

Moreover, the configuration change speeds 17 or the values Vi, i+1, APPR have been determined in such a manner that dropping below VMINOP, subject to the deceleration rates that are typical for the respective configurations and the influence of wind gusts, is unlikely to occur, but that nevertheless an adequate hysteresis distance 5 to the retraction speeds of the approach mode is ensured. Because of the strong influence that the running gear has on drag, it is sensible to take into account the running gear position in determining these values.

If the configuration change speeds tend to be located in the upper region of the speed band 1, then not only does the configuration increase already at relatively high speeds, but on average the drag during an approach is also high, which can definitely be desirable in order to support deceleration of the aircraft down to approach speed.

In further exemplary embodiments it is also possible for a determination of the configuration change speeds 17 to take place according to flight performance aspects, as already discussed in the context of determining the switching speeds 16 for the takeoff operating mode of the automatic system. In this way particularly low-drag approaches and thus low-fuel-consumption or low-noise approaches can be implemented.

A decision as to which of the two last-mentioned solutions is the preferred one primarily depends on the approach method, i.e. on the selected approach aids and the guiding system, characterised by the altitude profile and the speed profile of the flight.

Moreover, the configuration change speed which brings the high-lift elements 21, 22 into the configuration provided for landing needs to be higher than the minimum operational speed of the configuration to which a change takes place, plus a speed margin 5". The extent of this speed margin VAPPR, max results from aircraft-specifically required supplements for wind and turbulence to the reference speed for final approach. This rule prevents a situation in which the configuration change speed, which causes the change to the landing configuration, is below the approach speed VAPPR.

Depending on the aircraft mass and the speed requirements in the holding flight it may be necessary for the high-lift flaps 21, 22 to be extended in the holding flight. The present exemplary embodiment does not provide for an operating mode dedicated purely to the holding flight. Instead, the speed-dependent extension of the high-lift flaps according to FIG. 8 takes place in the approach mode. If the speed drops below VCC01, APPR, the high-lift flaps 21, 22 move from the retracted state 0 to the nearest extended position 1. Without the requirement of a change in the operating mode, the high-lift flaps are moved back to configuration zero when the switching speed VCC10, APPR is exceeded.

Figure 9:
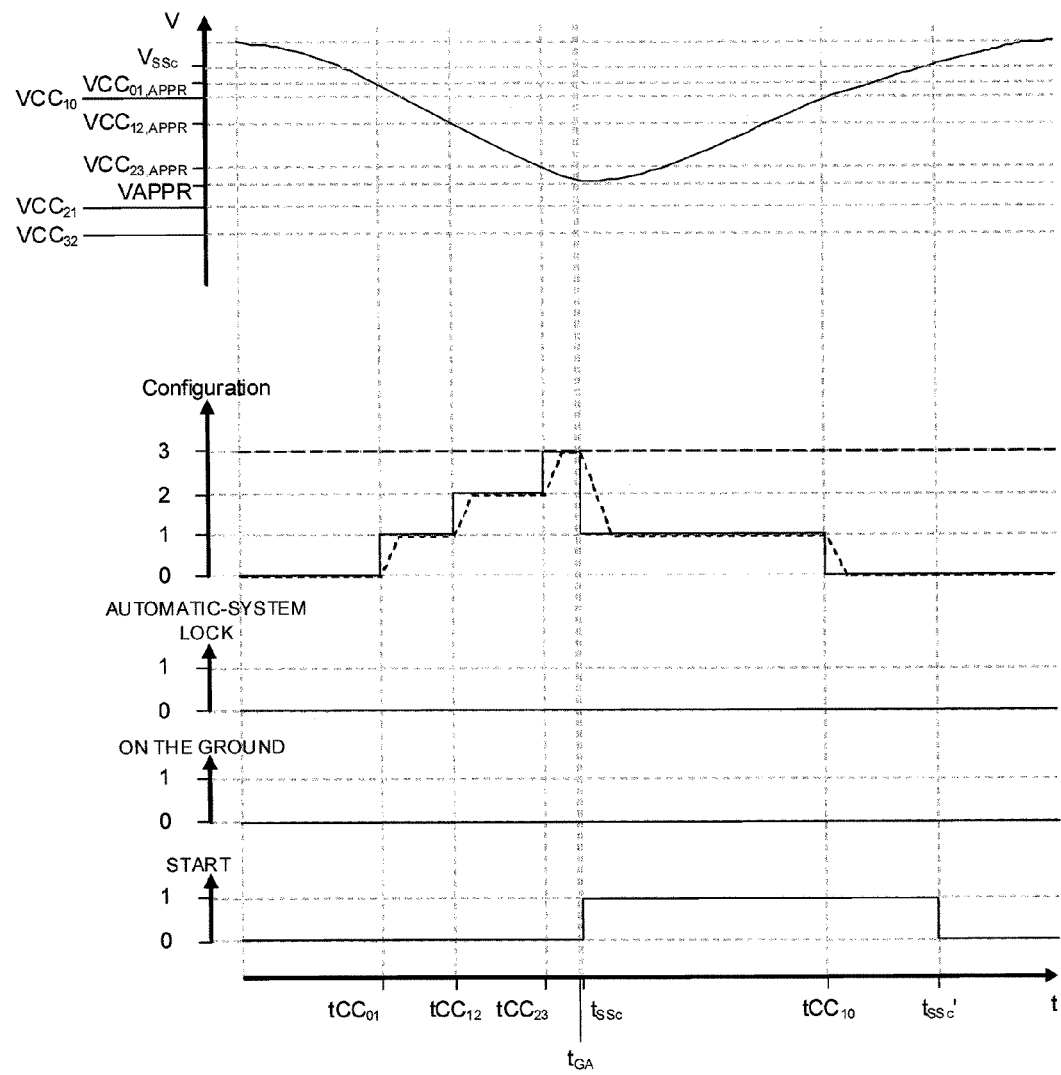
FIG. 9 a diagram showing progressions over time of state parameters and control parameters during the transition from the approach to the climbing flight in a go-around manoeuvre.
Figure 10:
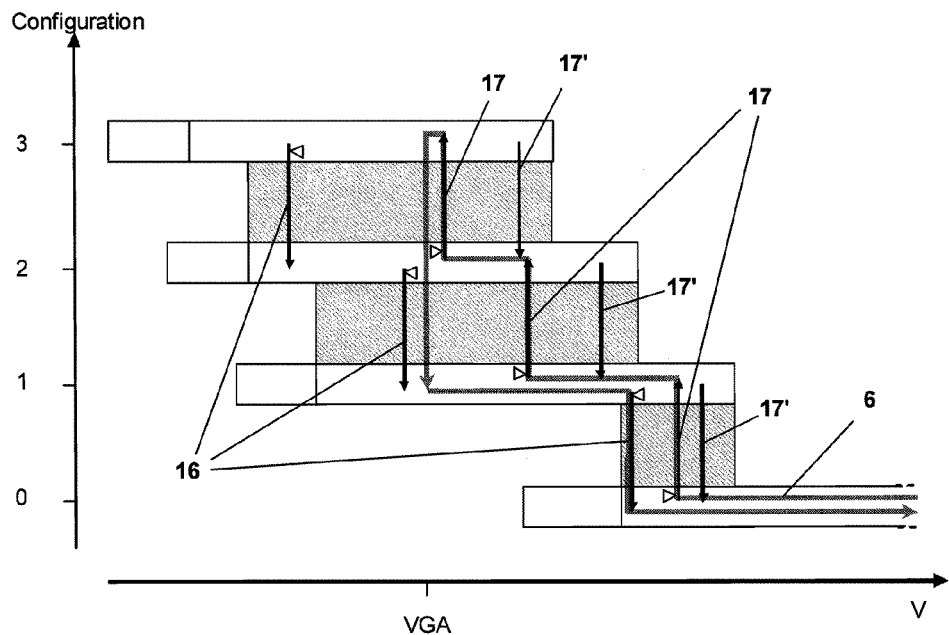
FIG. 10 a diagram showing the transition from the working curve for the approach to the working curve for takeoff in the case of a go-around.

Below, the function of the automatic system during the transition from the approach to the go-around phase will be explained with reference to the progression over time shown in FIG. 9. If the thrust is increased to a value provided for go-around, which in FIG. 9 takes place at the point in time tGA, then a signal for go-around is set. In other exemplary embodiments, setting the go-around signal can depend on further conditions, for example the condition according to which in addition a positive climb rate must be present, or that the high-lift flaps 21, 22 must at least be in the first extended configuration. FIG. 10 shows the path 6 of the speed during the manoeuvre together with the switching speeds. As soon as the go-around signal is present, switchover of the operating mode of the automatic flap switching device from approach to takeoff (point in time tSSc in FIG. 9) takes place, wherein the parameter "TAKEOFF" is set from 0 to 1. Since in the present example the current speed V to this point in time exceeds VCC32 and VCC21, a signal is generated that causes the high-lift flaps 21, 22 to be retracted to configuration 1. If the aircraft accelerates to a speed that exceeds VCC10, then, starting at tCC10, the flaps are fully retracted. If VSSc is exceeded at the point in time tSSc', finally, switchover from the takeoff mode back to the approach mode takes place.

The described sequence is correspondingly also applicable to the case where the aircraft has already touched down but the speed has not dropped to below VCCfret.

In the special case in which the aircraft shortly after takeoff makes a transition to an approach and the aircraft has not yet accelerated to a speed exceeding, or equal to, VSSc, the pilot must manually bring about the change from the takeoff mode to the approach mode of the automatic system by activating the pushbutton 19. In further embodiments of the automatic control device of the high-lift system it may be possible to do without this manual input if apart from the speed-controlled automatic switchover an alternative condition is added, which condition may, for example, be that the lowpass-filtered climbing rate drops to below a predefined threshold value.

Figure 11:
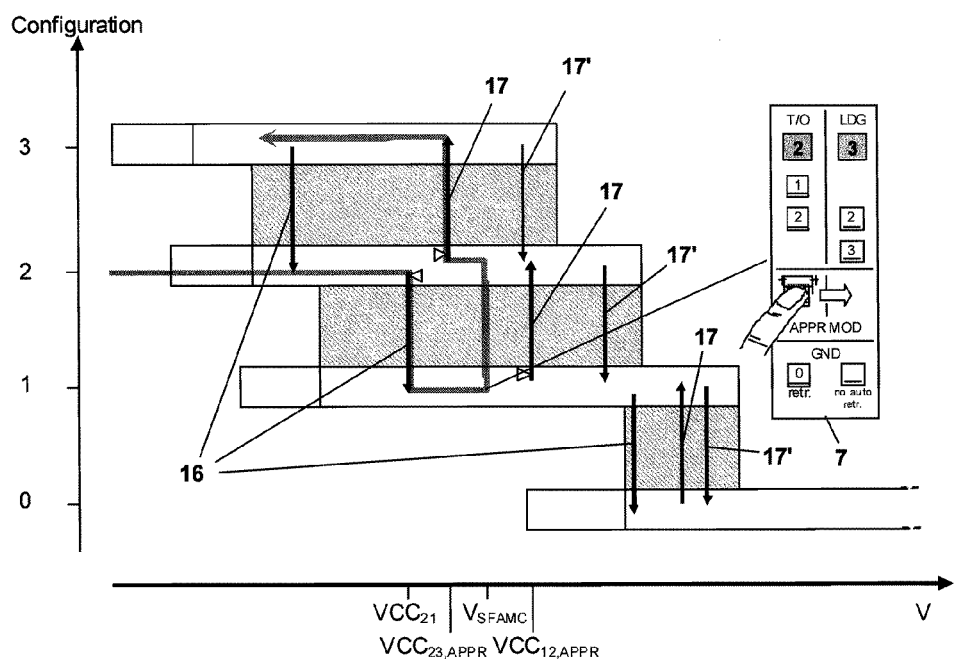
FIG. 11 a diagram showing the transition from the working curve for takeoff to the working curve for the approach.

In the diagram shown in FIG. 11, switchover takes place at a point characterised by the flight speed VSFAMC. In this process the aircraft is first in configuration 1. However, since the current speed is below the configuration change speed VCC12, APPR, immediately after switchover a signal for extension of the high-lift flaps to configuration 2 is issued. To make it possible for the crew to assess whether, and if so by how many increments, the high-lift elements 21, 22 are to extend after activation of the pushbutton 19 for switchover, the flap position instruction expected at the speed at the time in the automatic approach mode is displayed on a display device to the pilot or pilots.

In line with normal behaviour in the approach mode, in the case of further deceleration and the speed dropping to below VCC23, APPR, a change to configuration 3 takes place if this configuration has been preselected as the landing configuration. If no landing configuration was preselected and the speed drops to below VCC23, APPR, then the high-lift elements 21, 22 nevertheless move to configuration 3 if it has been provided as the base setting, which is assumed in the present exemplary embodiment.

If a decision to land is reversed, then a change from the approach mode back to the takeoff operating mode can take place according to the process described above in the context of a go-around.

Since implementation of the automatic control of the high-lift system can take place either in an analog or in a digital computer architecture, hereinafter the designations "signal" and "parameter" are used as synonymous designations. The automatic control system can be provided either as a software module or as a hardware module of the overall control system. However, according to the exemplary embodiment, the automatic control system is preferably implemented in the form of a software program in the assumed digital computer architecture of the flap control unit 26.

Figure 12:
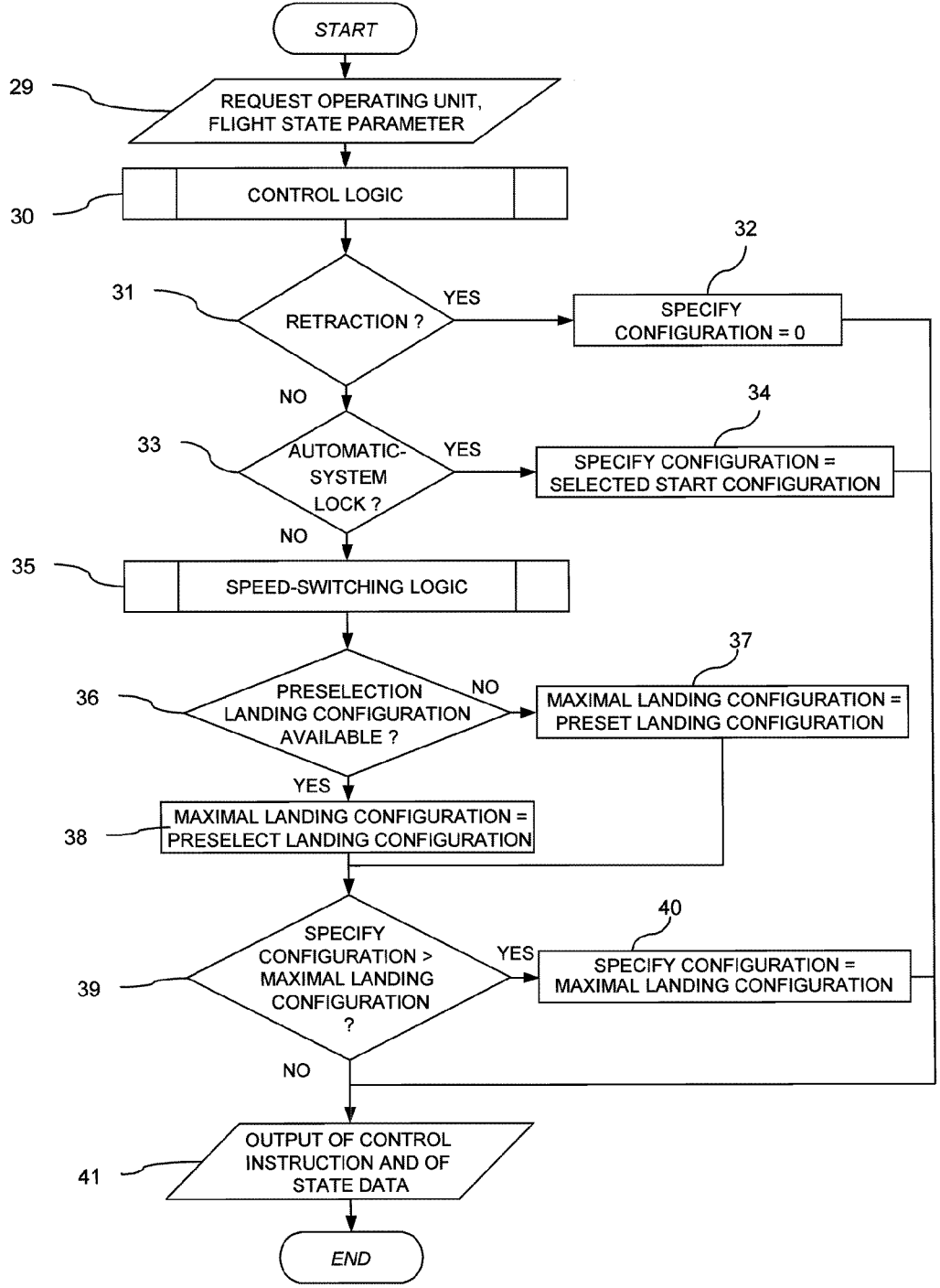
FIG. 12 a simplified program flow chart of an automatic control of the high-lift system of an aircraft, according to an exemplary embodiment of the invention.

A simplified flow diagram of such a program is shown in FIG. 12. The program is embedded in a real-time environment and is called up repeatedly at defined intervals, several times per second.

First, in block 29, the state of the operating unit 7 and the flight state parameters required for the switching logic are queried from the unit designated with reference character 27. In the control logic 30 the states of the control parameters are determined which influence the behaviour of the automatic flap switching device. Subsequently, the branch point 31 is queried as to whether or not the signal for complete retraction of the flaps on the ground is present. In the former case the control instruction "SPECIFY CONFIGURATION" in block 32 is set to the value 0. In the second case the branch point 33 is queried as to whether the signal "AUTOMATIC-SYSTEM LOCK" has the value 1. If this is the case, in program step 34 the control instruction "SPECIFY CONFIGURATION" is set to the manually preselected value for the takeoff configuration. If the result of block 33 is logically incorrect, characterised by the output "NO", the speed-switching logic 35 is called up, which generates a new value for the control instruction "SPECIFY CONFIGURATION" depending on the value of this parameter during call up, and depending on the aircraft mass, the current operating mode, the calibrated flight speed V and the altitude relative to the standard pressure area. In branch 36 a check takes place whether a valid value "PRESELECT LANDING CONFIGURATION" is available, i.e. a configuration which was manually selected by way of the switches 12 of the operating unit 7. If this is the case, the parameter "MAXIMUM LANDING CONFIGURATION" in block 38 is set to the value "PRESELECT LANDING CONFIGURATION". If no preselection value is available, then the program run path designated "NO" is taken, starting from branch 36, and in block 37 the parameter "MAXIMUM LANDING CONFIGURATION" is set to the value of the base setting for the landing configuration. In the further program sequence branch 39 ensures that the result of block 35 does not exceed the value of the maximum landing configuration. If the specified value for the configuration is above the maximum value for the landing configuration, then the control instruction "SPECIFY CONFIGURATION" in the block with reference character 40 is limited to the maximum value for the landing configuration. The control instruction is transmitted in block 41 for carrying out the adjustment of the high-lift flaps 21, 22. Furthermore, state parameters of the control system are output for the purpose of displaying them, and feedback to the operating unit is generated.

Figure 13:
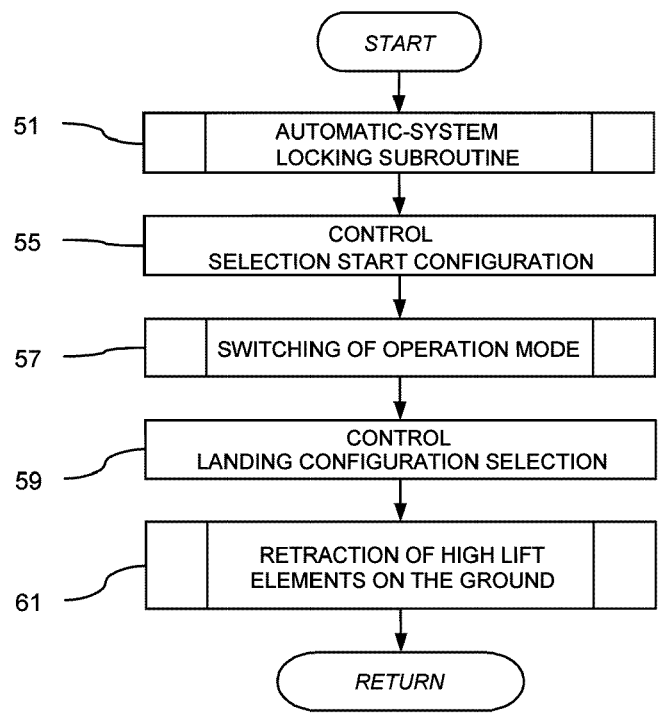
FIG. 13 a simplified program flow chart of a sub-program that comprises significant elements of the logic control circuit.

FIG. 13 shows a simplified program flow chart of the control logic, whose call-up in the main program (FIG. 12) is designated 30. The control logic in turn sequentially calls up further sub-programs or process steps. In the sequence of the diagram, under reference character 51 this is the call-up of a subroutine for generating the signal "AUTOMATIC-SYS- TEM LOCK" (FIG. 14) that is required in branch point 33 of the main program. The block with reference character 55 comprises the processes which on the one hand are required for deleting the selected takeoff configuration value after takeoff, and which on the other hand ensure that any activation of the switches 11 at a point in time at which activation is neither intended nor required results in undesirable behaviour of the automatic high-lift system. The signal "TAKEOFF" is the result of the subroutine for switching the operating mode (FIG. 16), whose call-up takes place under reference character 57, which signal is required for generating the control specification for the high-lift flaps 21, 22 in the subroutine called up from the main program (FIG. 12) under reference character 35, which subroutine comprises the speed logic (FIG. 17). The subsequent block 59 comprises the processes for keeping or deleting the landing configuration specifications. Finally, under reference character 61 a subroutine (FIG. 16) is called up that can generate a signal which controls retraction of the high-lift elements 21, 22 on the ground, and which is used in the branch point with the reference character 31 of the main program (FIG. 12).

Figure 14:
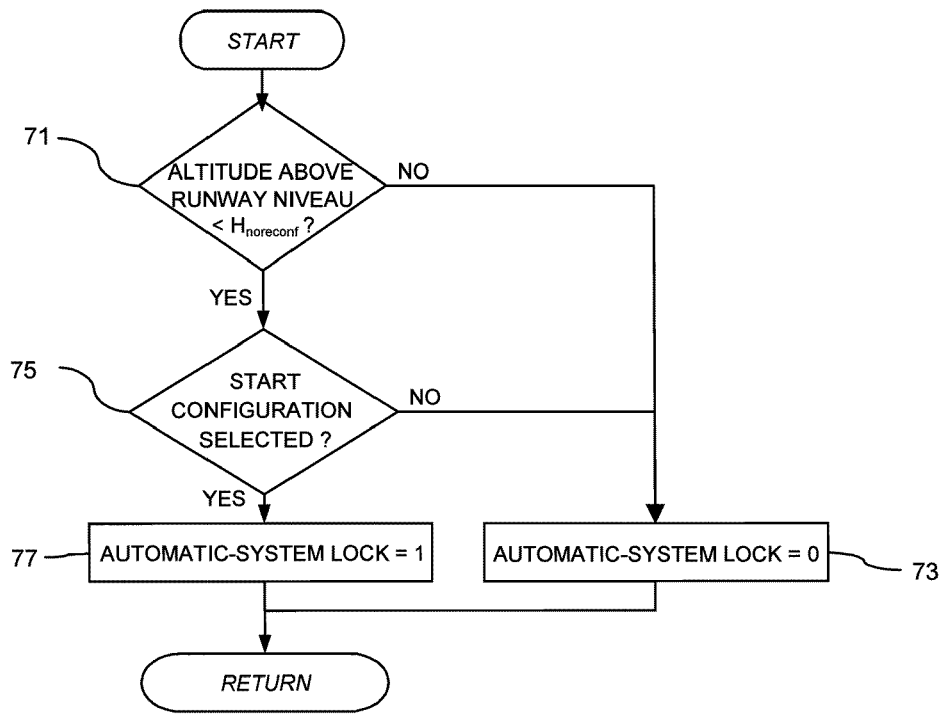
FIG. 14 a program flow chart of a logic circuit that makes it possible to determine the conditions in which the automatic system is not to be effective.

FIG. 14 shows a program flow chart for the sub-program "AUTOMATIC-SYSTEM LOCKING SUBROUTINE" for evaluation of the automatic-system lock. At branch point 71 a check takes place whether the aircraft is still below a certain altitude Hnoreconf. If the answer to the query of branch 71 is "YES", there is a further query at branch 75 as to whether a valid takeoff configuration was selected. If this is the case, the parameter or the signal "AUTOMATIC-SYSTEM LOCK" in the block with reference character 77 is set to the value zero or logically true. If the answer to one of the two queries 71 or 75 is "NO", then in process step 73 the signal "AUTOMATIC-SYSTEM LOCK" is set to the value zero, which corresponds to logically untrue.

Figure 15:
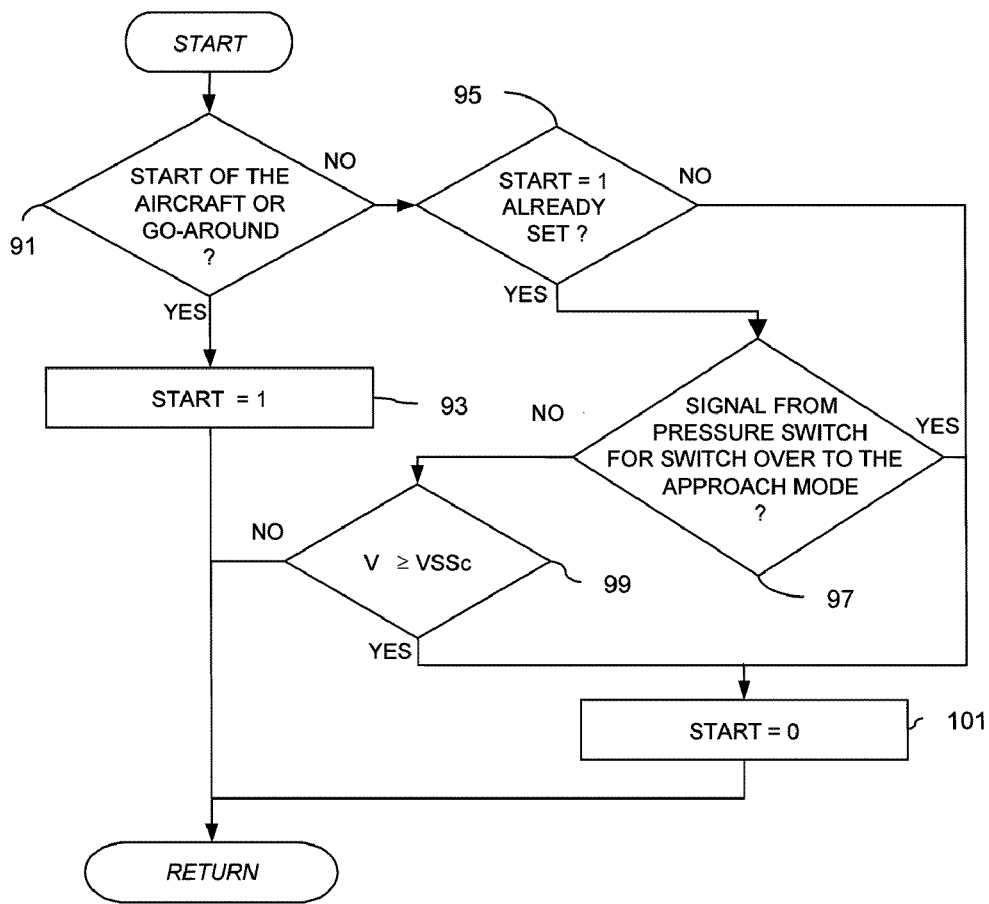
FIG. 15 a program flow chart of a logic circuit for switching the operating mode.

FIG. 15 shows the subroutine "OPERATING MODE SWITCHING". A module 91 determines whether a signal for go-around has been set. If this is the case, then in block 93 the parameter "TAKEOFF" is set to the value zero. If no signal for go-around is present at the input of module 91, then branching to query 95 takes place, wherein it is determined whether the parameter "TAKEOFF" already has the value zero. If this is the case, then in block 97 a check takes place whether a signal from the pressure switch is present for switchover to the approach mode 19. If this is not the case either, then finally in 99 a check takes place whether the current flight speed has already reached, or exceeded, the speed for automatic operating mode switching VSSc. In other words, if the automatic system is in the operating mode "TAKEOFF", if no signal from switch 19 is present, and if speed VSSc has not yet been reached, then a return to the calling-up routine takes place without the value of parameter "TAKEOFF" having been changed. In block 101 the value "TAKEOFF" can be set to zero, which means that the automatic control device of the high-lift system is in the operating mode provided for approach, or is changing to this operating mode. This occurs when after the query at block 95 the program sequence follows the branch designated "NO", or follows the branches which at the output of branch 97 or 99 are designated "YES".

Figure 16:
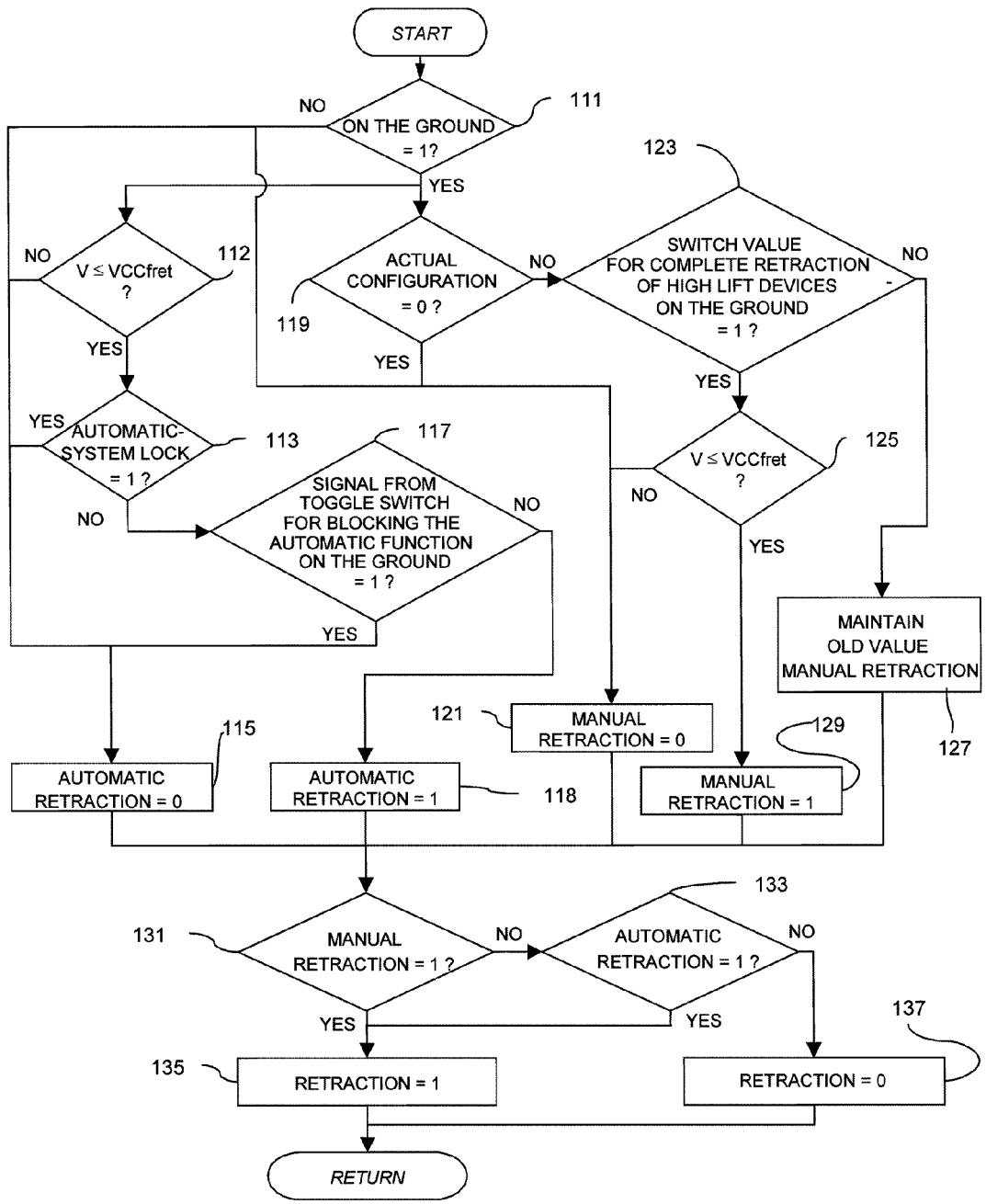
FIG. 16 a program flow chart of a sub-program that determines a parameter that controls automatic or manual retraction of the high-lift flaps on the ground.
Figure 17:
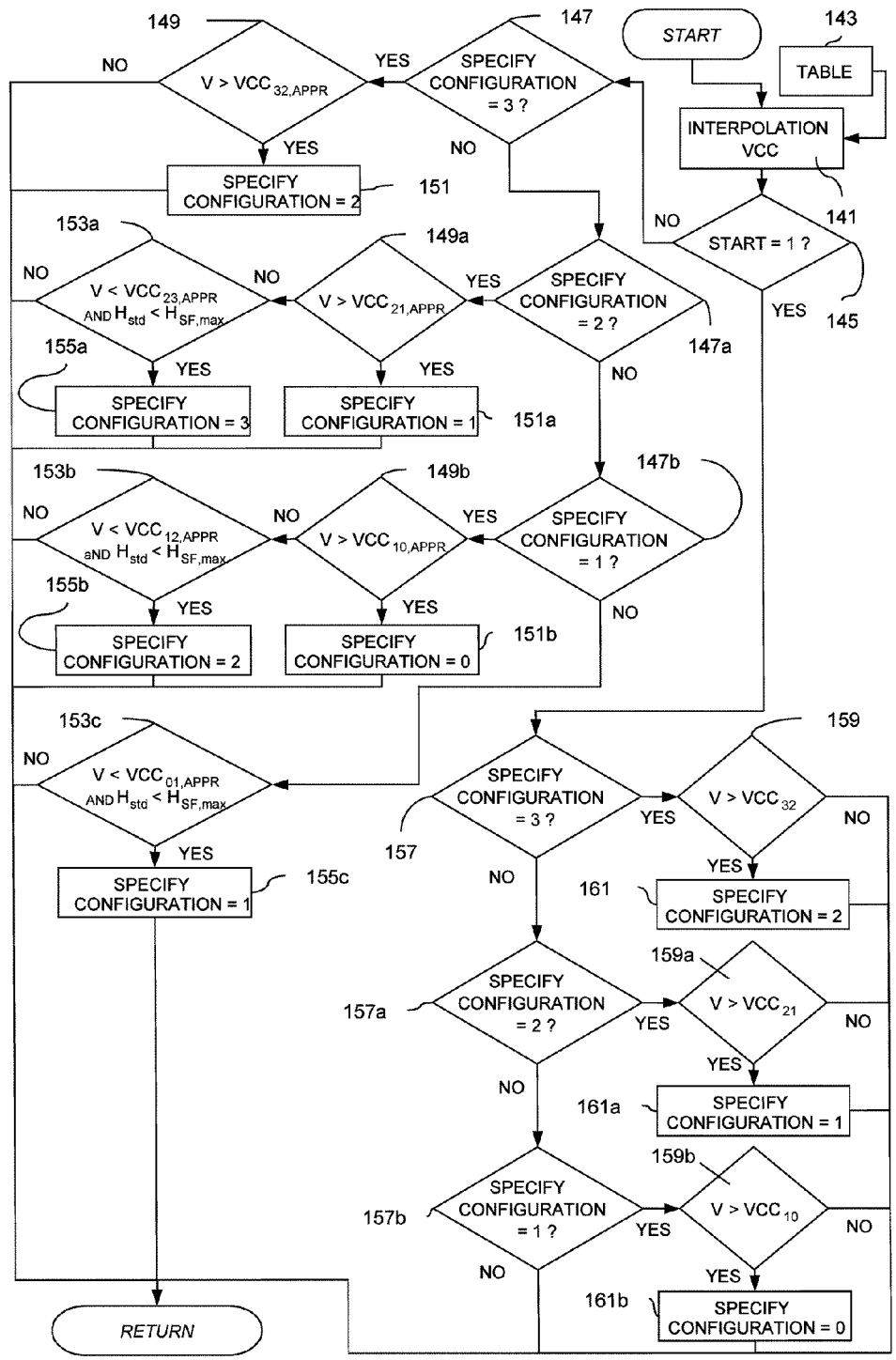
FIG. 17 a program flow chart for a logic circuit that determines configuration change speeds, and with reference to the configuration instruction present at the time and the flight speed at the time, as well as if applicable the flight altitude, generates signals for retracting or extending the high-lift flaps.

FIG. 16 shows a flow diagram for a subroutine that controls retraction of the high-lift flaps 21, 22 on the ground. The first branch occurs in block 111 depending on the signal "ON THE GROUND". If the aircraft is not on the ground, the parameters "AUTOMATIC RETRACT" in block 115 and "MANUAL RETRACT" in block 121 are set to ZERO. If the aircraft is on the ground, the program sequence follows a first branch, in which the conditions for setting a signal for automatic retraction of the high-lift flaps on the ground are checked, which program sequence commences at branch 112, and a second branch which checks the conditions for manual refraction of the flaps on the ground and which starts with branch 119. The branch for automatic control commences with the query in block 112 as to whether the speed V is less than, or equal to, the maximum speed VCCfret provided for flap retraction. If yes, then in 113 there is a query as to whether the value of the parameter "AUTOMATIC-SYSTEM LOCK" is one. If this is not the case, and if no signal from the toggle switch for blocking the automatic system function on the ground 14 is present in branch 117, then the parameter "AUTOMATIC RETRACT" is set to the value one in block 118. If the toggle switch 14 is pushed in, and if the corresponding signal is one, then automatic refraction of the high-lift devices on the ground is to be blocked, and in the block with reference character 115 the parameter "AUTOMATIC RETRACT" is set to zero. The same step 115 is carried out if a check of the switching condition in the branch points 111 or 112 returns "NO", in other words if the aircraft is either in the air, or if the speed on the ground is still high. If neither are the case, but if the signal "AUTOMATIC-SYSTEM LOCK" is set to zero, which results in a positive reply to the query in block 113, then 115 is also carried out. In the latter case the aircraft is thus in the phase of takeoff preparation or in the phase of takeoff taxiing procedure.

In parallel a further processing branch is pursued, which commences with query 119 as to whether the high-lift flaps 21, 22 are already in the fully retracted position. If this is the case, then in the block with reference character 121 the parameter "MANUAL RETRACT" is set to zero. A negative result to query 119 is followed, in block 123, with a query relating to the switch value 13 for full retraction of the high-lift flaps on the ground, and branching to block 125 in the positive case. If the speed V at the time, of the aircraft, is lower than, or equal to, VCCfret, then in block 129 the parameter "MANUAL RETRACT" is set to the value one. In the other case, if the speed is high, in 125 branching to block 121 takes place, and the parameter "MANUAL RETRACT" is given the value zero. If the switch 13 is not pushed in and consequently the signal is zero, then branching from 123 to block 127 takes place, which denotes that the value, present at commencement of the subroutine, of the parameter "MANUAL RETRACT" is maintained. Further execution of the sub-program takes place by checking the parameter "MANUAL RETRACT" at branch point 131. If the flaps are to be retracted, then in block 135 the signal "RETRACT" is set to the value one. If no signal is present for manual flap retraction, then in 133 a check takes place as to whether the signal for automatic retraction of the high-lift flaps 21, 22 is set, and corresponding to the Boolean value, branching to block 135 takes place, or if the high-lift flaps 21, 22 are not to be retracted, branching to block 137 takes place.

The speed-switching logic, in relation to which a program flow chart is shown in FIG. 17, is an essential element of the invention. After commencement of the subroutine, first, in module 141, the configuration change speeds VCC are determined, from a table 143 by means of interpolation routing, depending on the actual aircraft mass.

If the automatic control device of the high-lift system is in the operating mode "TAKEOFF", then the program sequence in branch 145 is led to the corresponding branch designated "YES". If the control instruction relating to the configuration "SPECIFY CONFIGURATION" has the value 3, then in branch 157 the program sequence is forwarded for checking the speed switching condition in branch block 159. Pursuing this branch is of relevance only in the case of go-around, because in the present exemplary embodiment the configuration 3 is not provided for takeoff. If the speed V exceeds the configuration change speed VCC32, then in the block designated by reference character 161 the value "SPECIFY CONFIGURATION" is set to the value 2; in other words, the high-lift flaps 21, 22 are to be retracted by one configuration increment. If this is not the case, then the present value 3 of the control instruction "SPECIFY CONFIGURATION" is maintained, and a return to the main program takes place. The queries relating to initial configuration specifications 2 and 1 under reference character 157a or 157b take place analogously, with a fully analogue check of the speed switching conditions in 159a or 159b, and if applicable the setting of new, changed specifications in 161a or 161b. Since in takeoff operating mode an increase in the configuration is not provided for, there is no branch for configuration 0.

If the automatic control device of the high-lift system is not in the takeoff operating mode but instead in the approach mode ("TAKEOFF"=0), then in branch 145 the program sequence is led to the branch designated "NO". Analogous to the query in block 157 a check as to whether the parameter "SPECIFY CONFIGURATION" has the value 3 takes place in branch 147. If the result is positive and if the speed exceeds the configuration change speed VCC32, APPR for retracting the high-lift flaps 21, 22 from the specification of the furthest-extended configuration 3 to configuration 2, which is checked in the branch block designated by reference character 149, in block 151 the parameter "SPECIFY CONFIGURATION" is set to the value 2. If "SPECIFY CONFIGURATION" had a value of 2 already at the start of the subroutine, then at branch point 147a the program sequence is led to branch 149a. There, a check, analogous to 149, takes place. In case the flight speed V at the time does not exceed VCC21, APPR, which would cause refraction of the high-lift flaps 21, 22 by setting the parameter "SPECIFY CONFIGURATION" to 1 in block 151a, in block 153a a check takes place as to whether V is less than VCC23, APPR, and, furthermore, as to whether the altitude at the time is less than the maximum operating altitude of the aircraft with extended high-lift flaps 21, 22. If both conditions return a logically true result, block 155a is called up, and "SPECIFY CONFIGURATION" is set to the value 3.

The further program steps of the query cascade under reference character 147b take place analogously to 147 and 147a; branch 149b is formulated analogously to 149 and 149a; the queries 153b and 153c analogously to 153a; the program step 151b analogously to 151 and 151a; and the steps 155b and 155c analogously to 155a. In each case, finally, return to the main program takes place.

By reducing the required pilot input in the above-described method for automatically controlling high-lift systems, the risk of incorrect manual operation, including operational omission, is reduced. Suitable takeoff- or landing configurations for the high-lift devices are determined in the normal, known way, depending on the takeoff performance calculation for the runway, as well as depending on the landing performance calculation for the planned runway at the destination. These two configurations are entered manually prior to takeoff by way of the operating unit 7. While the control signal for the takeoff configuration is implemented immediately, the landing preselection is saved. Only in a few cases will it be necessary to amend the landing configuration preselection during the approach preparation as a result of a change in boundary conditions, which may, for example, be due to a change in the runway or a wind change. For normal operation of a commercial aircraft or of a transport aircraft, except for the above-mentioned case, during a flight the crew is entirely relieved of manual operation of the high-lift system of the aircraft.

The present invention is also associated with an advantage in that special cases are taken into account in the operation of an aircraft, which cases relate to the control of the high-lift system. In particular, the explicit taking into account of the case of a go-around should be mentioned, for which up to now no fully automatic process has been described. Because in this case basically an increased workload of the cockpit crew can be assumed, the automatic system according to the invention achieves a significant easing of the workload, which also contributes to an improvement in aircraft safety.

Differentiating between various working curves for departure and approach allows significantly improved approximation to flight performance optima than would be achieved by a shared working curve. Furthermore, flight-phase-dependent switchover of the operating modes provides the potential for improved quietness in operation because alternating control signals for retracting and extending the flaps, as can occur in the case of transient fluctuation in the flight speed around individual switching conditions for retracting and extending the flaps, can largely be avoided. The criteria for switchover of the operating modes themselves are formulated in such a manner that quickly alternating changes in instructions are excluded. Nonetheless, for regular operation the system does not comprise any delay elements so that any change in the configuration is carried out immediately when a switching condition occurs. Explicit switchover of the operating modes furthermore allows largely independent determination on the one hand of the switching conditions for retraction of the high-lift flaps after takeoff, and on the other hand of the switching conditions for extension of the high-lift flaps during the approach prior to landing. This is a significant difference when compared to the speed-dependent automatic flap switching device, mentioned in the introduction, according to DE 25 31 799 C3, where such behaviour can only be achieved with manual adjustment by the pilot during the flight. During normal operation, in the present invention only the takeoff configuration and the landing configuration are specified by way of the operating unit 7. To complement the above there is the switchover device 19 for the transition from the takeoff mode to the approach mode. However, said switchover device 19 needs to be activated only in the case of special operating sequences. The same applies to manually controlling the flap system for retracting the flaps on the ground, and for the switch 14, which prevents automatic retraction of the flaps 21, 22 on the ground.

The actual function of the automatic high-lift system is based on a limited number of flight state parameters, of which the calibrated flight speed and an estimated value of the momentary mass of the aircraft are the most important, thus picking up the simple concept of flight-speed-dependent control of the high-lift flaps 21, 22. However, in contrast to the known speed-dependent automatic flap switching systems U.S. Pat. No. 2,350,751 or DE 25 31 799 C3, determining the configuration change speeds of the aircraft takes place in such a manner that speed margins relating to the threshold operating speeds are maintained. For this reason too, the invention contributes to improving flight safety. For optimisation of the switching points in relation to particular requirements of various flight phases a further parameter is required that makes it possible to differentiate between the corresponding operating modes. For the purpose of switching the operating mode, the exemplary embodiment described above provides for a signal that indicates whether or not the aircraft is in the takeoff phase or in the go-around phase.

Furthermore, an altitude signal is required that relates to a fixed reference altitude or pressure area.

The above-mentioned flight state parameters are supplemented by a ground signal and a signal relating to the configuration at the time of the high-lift flaps 21, 22. Since all the mentioned signals are of fundamental importance to the operation of today's large aircraft, the corresponding components for generating these signals feature very high operational reliability. In this respect the presently proposed automatic control system is distinct from systems whose function is based on flight planning data and navigation data, as is the case in U.S. Pat. No. 4,042,197 or EP 1 684 144 A1, because, as a rule, the availability of their signals is considerably lower.

LIST OF REFERENCE CHARACTERS

1 Operational speed band
1' Overlap region
2 Speed path
3 Speed margin
4 Speed path
5 Differential speed
5' Differential speed
5" Speed margin
6 Speed path
7 Operating unit
8 Operator control panel takeoff configuration selection
9 Operator control panel landing configuration preselection
10 Operator control panel ground control functions
11 Pushbuttons for takeoff configuration selection
12 Pushbuttons for landing configuration preselection
13 Pushbutton for retraction on the ground
14 Automatic-system lock
15 Numeric displays
16 Configuration change speed
17 Configuration change speed
17' Configuration change speed
18 Operator control panel switchover
19 Push button for direct switchover
20 Wing
21 Leading-edge flap
22 Trailing-edge flap
23 Drive units
24 Mechanical connections
25 Control connection
26 Flap control unit
27 Summary of functions for acquiring, processing and transmitting data
27' Further functions integrated in the on-board computer
28 On-board computer
29 Query operating unit and flight state parameters
30 Call-up logic control circuit
31 Query whether the signal for full retraction of the high-lift flaps on the ground is present
32 Set the specified configuration value to 0
33 Branch point
34 Set the specified configuration value to value for takeoff
35 Call up the speed switching logic
36 Branch point
37 Set the maximum landing configuration to the preset value
38 Set the maximum landing configuration to the preselection value
39 Branch point
40 Set the maximum landing configuration to the specified value
41 Transmit the positioning instructions and state-data
51 Call up AUTOMATIC-SYSTEM LOCKING SUBROUTINE
55 Call up a process block for controlling the takeoff configuration selection
57 Call up OPERATING MODE SWITCHING
59 Call up a process block for controlling the landing configuration preselection
61 Call up RETRACT THE HIGH-LIFT FLAPS ON THE GROUND
71 Branch point
73 Process block
75 Branch point
77 Process block
91 Branch point
93 Process block
95 Branch point
97 Branch point
99 Branch point
101 Process block
111 Branch point
112 Branch point
113 Branch point
115 Process block
117 Branch point
118 Process block
119 Branch point
121 Process block
123 Branch point
125 Branch point
127 Process block
129 Process block
131 Branch point
133 Branch point
135 Process block
137 Process block
141 Process block
143 Table
145 Branch point
147 Branch point
147a Branch point
147b Branch point
149 Branch point
149a Branch point
149b Branch point
151 Process block
151a Process block
151b Process block
153a Branch point
153b Branch point
153c Branch point
155a Process block
155b Process block
155c Process block
157 Branch point
157a Branch point
157b Branch point
159 Branch point
159a Branch point
159b Branch point
161 Process block
161a Process block
161b Process block

The invention claimed is:

1. A device for automatically controlling a high-lift system of an aircraft, comprising:
   high-lift elements that can be set to a retracted and to several extended configurations for cruising, takeoff or landing;
   a flap control unit that by way of a control connection is connected, so as to be functionally effective, to a drive system of the high-lift elements; and
   an operating unit, connected to the flap control unit, for entering operating instructions that influence the setting of the high-lift elements, wherein:
   the flap control unit is provided for calculating the respective configurations of the high-lift elements and directions of the configuration change of associated switching speeds for adjusting the high-lift elements, depending on at least one of: flight state data, and further flight-operation-relevant data,
   the flap control unit is provided to automatically generate the instructions that instruct the configuration change, depending on the flight speed, and
   the flap control unit is additionally provided for automatic switchover of operating modes for takeoff and landing approach respectively.

2. The device according to claim 1, wherein the operating unit is provided for separate input, for takeoff and for the approach to landing, of a preselected configuration that corresponds to at least one of: a desired maximum lift increase, and for separate input, for takeoff and for landing, of several different configurations.

3. The device according to claim 2, wherein the operating unit comprises separate operator control panels for takeoff configuration selection and for landing configuration preselection.

4. The device according to claim 3, wherein in the operator control panels for takeoff configuration selection and for landing configuration preselection in each case individual pushbuttons are provided that are associated with each configuration.

5. The device according to claim 2, wherein the operating unit comprises separate visual displays, associated with the operator control panels for takeoff configuration selection and for landing configuration preselection, which displays are provided for displaying the respectively made configuration preselection.

6. The device according to claim 1, wherein:
   the operating unit comprises an operator control panel with an activation element for direct manual switchover between a takeoff operating mode and an approach mode of the automatic control system, and
   the flap control unit generates the instructions that instruct the change in configuration corresponding to the manually entered operating mode.

7. The device according to claim 1, wherein the operating unit comprises a further operator control panel for ground control functions with operating elements for manually entering actuator instructions for the high-lift elements on the ground.

8. The device according to claim 7, wherein at least one of:
   the operator control panel for the ground control functions comprises an operator control panel for retracting the high-lift elements on the ground,
   the flap control unit is provided to only carry out the instruction that has been entered if a corresponding release signal is present, and
   the operator control panel for the ground control functions comprises an operating element that prevents automatic retraction of the high-lift elements after landing on the ground.

9. The device according to claim 8, wherein a visual display device that indicates the switching state is provided in the operating element that is provided for blocking the function of the automatic system on the ground.

10. The device according to claim 1, wherein the flap control unit is provided for setting a parameter, up to whose cancellation no automatic retraction of the high-lift elements takes place during the takeoff taxiing procedure and the initial steep climb until a predefined altitude above the level of the runway has been attained.

11. The device according to claim 1, wherein the flap control unit is provided for setting a parameter "TAKEOFF" by means of which parameter generating at least one of takeoff thrust and go-around thrust is provided, which parameter indicates that the flap control unit operates in the takeoff operating mode, or commences to operate after a change from the approach mode to the takeoff operating mode.

12. The device according to claim 11, wherein at least one of:
   the flap control unit is provided for resetting the parameter "TAKEOFF" if a speed has been exceeded which in the approach mode that is automatically applicable at that time does not lead to immediate extension of the high-lift flaps, and
   the flap control unit is provided for resetting the parameter "TAKEOFF" if a smoothed signal relating to the climb rate falls below a predefined threshold value.

13. A device for automatically controlling a high-lift system of an aircraft, comprising:
   high-lift elements that can be set to a retracted and to several extended configurations for cruising, takeoff or landing;
   a flap control unit that by way of a control connection is connected, so as to be functionally effective, to a drive system of the high-lift elements; and
   an operating unit, connected to the flap control unit, for entering operating instructions that influence the setting of the high-lift elements, wherein:
   the flap control unit is provided for calculating the respective configurations of the high-lift elements and directions of the configuration change of associated switching speeds for adjusting the high-lift elements, depending on at least one of: flight state data and further flight-operation-relevant data,
   the flap control unit is provided to automatically generate the instructions that instruct the configuration change, depending on the flight speed, and
   the flap control unit is provided, in the absence of a preselection made by way of the operating unit, for automatically moving the high-lift elements during an approach to the configuration usually provided for landing, if the corresponding speed-dependent configuration changes or switching conditions are met.

14. The device according to claim 13, wherein the switching change speeds or configuration change speeds that are associated with the respective configurations of the high-lift elements, the respective operating modes, and the configuration change directions depending on various aircraft weights are stored in tabular form in the flap control unit.

15. The device according to claim 14, wherein the switching or configuration change speeds are additionally stored in a differentiated manner according to at least one of flight altitude and flight Mach number.

16. The device according to claim 14, wherein the switching speeds or the configuration change speeds are, furthermore, stored depending on different running gear positions.

17. The device according to claim 16, wherein at least one of:
- the switching speeds or the configuration change speeds have been determined taking into account speed margins relating to maximum operational speeds in the respective high-lift configurations, and
- the switching speeds or the configuration change speeds have been determined with reference to speed margins relating to the maximum operational speeds as well as according to approach speeds that have to be considered maximum approach speeds in the respective configurations of the high-lift elements, defined by speed margins.

18. The device according to claim 13, wherein at least one of:
- the switching speeds or configuration change speeds that are associated with the respective configurations of the high-lift elements are calculated by way of operating-mode specific weighting factors and according to weighting factors differentiated according to directions of change of configurations, taking into account speed margins or differential speeds relating to operational operating limits that are present according to at least one of: conditions at the time, and conditions that are to be expected in relation to other high-lift configurations, and
- the configuration change speeds associated with the respective configurations of the high-lift elements have been determined by way of specific differential speeds relating to the operating limits to be expected in relation to the individual configurations under flight state data at the time and further flight-operation-relevant data, taking into account speed margins or differential speeds.

19. The device according to claim 18, wherein the weighting factors, the differential speeds relating to the operating limits, or the configuration change speeds for the takeoff operating mode have been determined according to at least one of: optimum climb performance characteristics, and minimum fuel consumption during approach.

* * * * *